US012510837B2

(12) United States Patent
Imura et al.

(10) Patent No.: US 12,510,837 B2
(45) Date of Patent: Dec. 30, 2025

(54) TONER

(71) Applicant: CANON KABUSHIKI KAISHA, Tokyo (JP)

(72) Inventors: Maki Imura, Kanagawa (JP); Hisasuke Kajihara, Ibaraki (JP); Kentaro Kamae, Kanagawa (JP); Yuu Nishimura, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 503 days.

(21) Appl. No.: 18/180,430

(22) Filed: Mar. 8, 2023

(65) Prior Publication Data

US 2023/0305414 A1 Sep. 28, 2023

(30) Foreign Application Priority Data

Mar. 23, 2022 (JP) ................................ 2022-046563

(51) Int. Cl.
*G03G 9/087* (2006.01)
*C08G 63/16* (2006.01)

(52) U.S. Cl.
CPC ......... *G03G 9/08755* (2013.01); *C08G 63/16* (2013.01)

(58) Field of Classification Search
CPC .......................... G03G 9/08755; G03G 9/087
See application file for complete search history.

(56) References Cited

U.S. PATENT DOCUMENTS

| | | | | |
|---|---|---|---|---|
| 7,833,687 | B2 | 11/2010 | Kato | |
| 8,084,174 | B2 | 12/2011 | Hasegawa | |
| 8,323,726 | B2 | 12/2012 | Naka | |
| 8,697,327 | B2 | 4/2014 | Shibata | |
| 8,921,023 | B2 | 12/2014 | Baba | |
| 8,927,188 | B2 | 1/2015 | Naka | |
| 8,974,994 | B2 | 3/2015 | Kamae | |
| 8,986,914 | B2 | 3/2015 | Fujikawa | |
| 9,057,970 | B2 | 6/2015 | Ida | |
| 9,058,924 | B2 | 6/2015 | Komatsu | |
| 9,063,443 | B2 | 6/2015 | Ishigami | |
| 9,348,247 | B2 | 5/2016 | Ida | |
| 9,540,483 | B2 | 1/2017 | Ida | |
| 9,665,023 | B2 | 5/2017 | Kamae | |
| 9,696,644 | B2 | 7/2017 | Ida | |
| 9,897,934 | B2 | 2/2018 | Tamura | |
| 9,915,885 | B2 | 3/2018 | Katsumata | |
| 9,969,834 | B2 | 5/2018 | Ohtsu | |
| 10,012,918 | B2 | 7/2018 | Ishigami | |
| 10,012,920 | B2 | 7/2018 | Shibata | |
| 10,012,921 | B2 | 7/2018 | Kamae | |
| 10,078,281 | B2 | 9/2018 | Ida | |
| 10,088,765 | B2 | 10/2018 | Miyakai | |
| 10,133,201 | B2 | 11/2018 | Kamae | |
| 10,203,619 | B2 | 2/2019 | Yamashita | |
| 10,216,108 | B2 | 2/2019 | Iwasaki | |
| 10,228,629 | B2 | 3/2019 | Tamura | |
| 10,234,777 | B2 | 3/2019 | Ohtsu | |
| 10,353,312 | B2 | 7/2019 | Kamae | |
| 10,423,090 | B2 | 9/2019 | Ohtsu | |
| 10,451,990 | B2 | 10/2019 | Kamae | |
| 10,514,624 | B2 | 12/2019 | Tamura | |
| 10,642,178 | B2 | 5/2020 | Yamashita | |
| 10,656,545 | B2 | 5/2020 | Kamae | |
| 10,775,710 | B1 | 9/2020 | Kamae | |
| 10,859,931 | B2 | 12/2020 | Hashimoto | |
| 10,877,386 | B2 | 12/2020 | Murayama | |
| 10,969,705 | B2 | 4/2021 | Shirayama | |
| 11,131,938 | B2 | 9/2021 | Murayama | |
| 11,429,032 | B2 | 8/2022 | Shibata | |
| 11,624,986 | B2 | 4/2023 | Kanno | |
| 11,662,670 | B2 | 5/2023 | Hama | |
| 2010/0196817 | A1* | 8/2010 | Sasaki et al. | G03G 9/087 |
| 2014/0308611 | A1 | 10/2014 | Shimano | |
| 2021/0055668 | A1 | 2/2021 | Tamura | |
| 2021/0141315 | A1 | 5/2021 | Kamae | |

(Continued)

FOREIGN PATENT DOCUMENTS

| | | |
|---|---|---|
| JP | 2004-46095 A | 2/2004 |
| JP | 2014-142632 A | 8/2014 |

OTHER PUBLICATIONS

U.S. Appl. No. 18/181,105, Nobuhiro Yoshida, filed Mar. 9, 2023.
U.S. Appl. No. 18/182,548, Kenta Mitsuiki, filed Mar. 13, 2023.
U.S. Appl. No. 18/183,368, Hisasuke Kajihara, filed Mar. 14, 2023.
U.S. Appl. No. 18/185,422, Kentaro Kamae, filed Mar. 17, 2023.
Robert F. Fedors, "A Method for Estimating Both the Solubility Parameters and Molar Volumes of Liquids", Polymer Eng. Sci., vol. 14, No. 2 (1974) 147-54.

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, wherein the binder resin comprises an amorphous polyester A and a crystalline polyester C; the amorphous polyester A has an amorphous polyester segment a1 and a2; the amorphous polyester segment a2 has a monomer unit of a specific alcohol a0; the crystalline polyester C is a polymer having a crystalline polyester segment c2 and a crystalline segment c1 bonded to the end of the crystalline polyester segment c2; the crystalline polyester segment c2 has a monomer unit of a specific alcohol b0; an absolute value of a difference between a carbon number of the linear aliphatic polyhydric alcohol a0 and a carbon number of the linear aliphatic polyhydric alcohol b0 is 4 or less; and SP values of the polyester segment a1 and a2, and the crystalline segment c1 and the crystalline polyester segment c2 satisfy specific relationships.

9 Claims, No Drawings

(56) References Cited

U.S. PATENT DOCUMENTS

| | | | |
|---|---|---|---|
| 2021/0181647 | A1 | 6/2021 | Hashimoto |
| 2021/0181651 | A1 | 6/2021 | Kanno |
| 2021/0278774 | A1 | 9/2021 | Hashimoto |
| 2021/0278775 | A1 | 9/2021 | Kamae |
| 2021/0286282 | A1 | 9/2021 | Kobori |
| 2021/0302853 | A1 | 9/2021 | Murata |
| 2021/0302854 | A1 | 9/2021 | Kitamura |
| 2021/0397106 | A1 | 12/2021 | Kobori |
| 2022/0050398 | A1 | 2/2022 | Ooyama |
| 2022/0197163 | A1 | 6/2022 | Kajihara |
| 2022/0197166 | A1 | 6/2022 | Chimoto |
| 2022/0197174 | A1 | 6/2022 | Kajihara |
| 2022/0342335 | A1 | 10/2022 | Ochi |
| 2022/0373911 | A1 | 11/2022 | Kamae |
| 2022/0373919 | A1 | 11/2022 | Imura |

* cited by examiner

TONER

BACKGROUND OF THE INVENTION

Field of the Invention

The present disclosure relates to a toner to be used in electrophotography, electrostatic recording, electrostatic printing, and the like.

Description of the Related Art

In recent years, with the widespread use of electrophotographic full-color copiers, not only higher speeds and higher image quality, but also additional performance improvements such as energy-saving performance, support for a wide variety of media, and the like are required.

Specifically, in order to reduce power consumption in a fixing process, a toner that can be fixed at a lower temperature and has excellent low-temperature fixability is needed as an energy-saving toner.

Accordingly, Japanese Patent Application Publication No. 2004-046095 proposes a toner using a crystalline polyester for a binder resin of the toner as a toner excellent in low-temperature fixability.

In addition, a demand for printing adapted to a print-on-demand (POD) mode is increasing, and there is a need to support a wide variety of media such as thick paper and coated paper in addition to plain paper. There is also a growing demand for robust image strength that is not dependent on the environment in which the printed matter is used or stored, such as heat resistance of printed image. Japanese Patent Application Publication No. 2014-142632 proposes a toner using a nucleating agent as a toner excellent in image heat resistance.

Meanwhile, depending on storage conditions, blooming, in which crystalline materials such as wax and crystalline polyester are exposed on the toner surface, may occur with the passage of time. When blooming occurs, members such as a developer carrying member and the like are contaminated with the exposed wax, so there is a demand for a toner excellent in blooming resistance.

The toner described in Japanese Patent Application Publication No. 2004-046095 uses a crystalline polyester. Since crystalline polyesters have a sharper melt property than amorphous polyesters and also act as plasticizers for amorphous polyesters, crystalline polyesters are effective materials for low-temperature fixing of toners. However, where a crystalline polyester is excessively compatible with a binder resin, the heat resistance will be reduced, so that problems such as sticking of images may occur and image heat resistance may deteriorate, for example, when images are stored under high temperature and high humidity.

Meanwhile, the toner described in Japanese Patent Application Publication No. 2014-142632 uses a binder resin including a crystalline resin and further uses a nucleating agent to improve the heat resistance of images. However, when the crystallization rate is not sufficient, the crystalline polyester in the toner may bloom (outmigration of the crystalline polyester) over time depending on storage conditions. The blooming crystalline polyester forms flakes on the toner surface, and in some cases, falls off from the toner, deteriorating the storability and charging performance of the toner. In addition, the plasticization of the amorphous polyester becomes insufficient, resulting in a decrease in low-temperature fixability.

It follows from the above that it is difficult to satisfy all of low-temperature fixability, image heat resistance, and blooming resistance. Therefore, there is an urgent need to develop a toner that exhibits excellent image heat resistance and blooming resistance, and at the same time, enables fixing at a lower temperature and exhibits low-temperature fixability.

The present disclosure provides a toner exhibiting excellent image heat resistance and blooming resistance, as well as low-temperature fixability enabling fixing at a lower temperature.

SUMMARY OF THE INVENTION

The present disclosure is directed to providing a toner comprising a toner particle comprising a binder resin, wherein

- the binder resin comprises an amorphous polyester A and a crystalline polyester C;
- the amorphous polyester A has an amorphous polyester segment a1 and an amorphous polyester segment a2;
- the amorphous polyester segment a2 has a monomer unit of a linear aliphatic polyhydric alcohol a0 having a carbon number of 2 to 10 as a monomer unit forming a main skeleton of the amorphous polyester segment a2;
- a difference between an SP value of the amorphous polyester segment a2 and an SP value of the amorphous polyester segment a1 [(SP value of a2)−(SP value of a1)] is 0.80 $(cal/cm^3)^{0.5}$ or more;
- the crystalline polyester C is a polymer having a crystalline polyester segment c2 and a crystalline segment c1 bonded to the end of the crystalline polyester segment c2;
- the crystalline polyester segment c2 has a monomer unit of a linear aliphatic polyhydric alcohol b0 having a carbon number of 2 to 10 as a monomer unit forming a main skeleton of the crystalline polyester segment c2;
- an absolute value of a difference between a carbon number of the linear aliphatic polyhydric alcohol a0 and a carbon number of the linear aliphatic polyhydric alcohol b0 is 4 or less;
- a difference between an SP value of the crystalline polyester segment c2 and an SP value of the crystalline segment c1 [(SP value of c2)−(SP value of c1)] is 0.75 $(cal/cm^3)^{0.5}$ or more;
- a difference between the SP value of the amorphous polyester segment a1 and the SP value of the crystalline polyester segment c2 [(SP value of a1)−(SP value of c2)] is 0.80 $(cal/cm^3)^{0.5}$ or less; and
- a difference between the SP value of the amorphous polyester segment a2 and the SP value of the crystalline segment c1 [(SP value of a2)−(SP value of c1)] is 2.00 $(cal/cm^3)^{0.5}$ or more.

Further features of the present invention will become apparent from the following description of exemplary embodiments.

DESCRIPTION OF THE EMBODIMENTS

In the present disclosure, the description “from XX to YY” or “XX to YY” indicative of the numerical value range means the numerical value range including the lower limit and the upper limit of the endpoints unless otherwise specified. Further, a monomer unit refers to the reacted form of the monomer substance in the polymer. Furthermore, a crystalline resin is a resin in which an endothermic peak is observed in differential scanning calorimetry (DSC).

The present disclosure is directed to providing a toner comprising a toner particle comprising a binder resin, wherein the binder resin comprises an amorphous polyester A and a crystalline polyester C;

the amorphous polyester A has an amorphous polyester segment a1 and an amorphous polyester segment a2;

the amorphous polyester segment a2 has a monomer unit of a linear aliphatic polyhydric alcohol a0 having a carbon number of 2 to 10 as a monomer unit forming a main skeleton of the amorphous polyester segment a2;

a difference between an SP value of the amorphous polyester segment a2 and an SP value of the amorphous polyester segment a1 [(SP value of a2)−(SP value of a1)] is 0.80 $(cal/cm^3)^{0.5}$ or more;

the crystalline polyester C is a polymer having a crystalline polyester segment c2 and a crystalline segment c1 bonded to the end of the crystalline polyester segment c2;

the crystalline polyester segment c2 has a monomer unit of a linear aliphatic polyhydric alcohol b0 having a carbon number of 2 to 10 as a monomer unit forming a main skeleton of the crystalline polyester segment c2;

an absolute value of a difference between a carbon number of the linear aliphatic polyhydric alcohol a0 and a carbon number of the linear aliphatic polyhydric alcohol b0 is 4 or less;

a difference between an SP value of the crystalline polyester segment c2 and an SP value of the crystalline segment c1 [(SP value of c2)−(SP value of c1)] is 0.75 $(cal/cm^3)^{0.5}$ or more;

a difference between the SP value of the amorphous polyester segment a1 and the SP value of the crystalline polyester segment c2 [(SP value of a1)−(SP value of c2)] is 0.80 $(cal/cm^3)^{0.5}$ or less; and a difference between the SP value of the amorphous polyester segment a2 and the SP value of the crystalline segment c1 [(SP value of a2)−(SP value of c1)] is 2.00 $(cal/cm^3)^{0.5}$ or more.

The present inventors have investigated a toner exhibiting excellent image heat resistance and blooming resistance, as well as low-temperature fixability enabling fixing at a lower temperature. Where a crystalline polyester is made compatible with an amorphous polyester in order to improve the low-temperature fixability, as shown in Japanese Patent Application Publication No. 2004-046095, the crystalline polyester also acts as a plasticizer for the amorphous polyester. However, meanwhile, the image heat resistance is poor, and both low-temperature fixability and image heat resistance cannot be achieved.

Therefore, the present inventors thought that it is important to phase-separate the amorphous polyester and the crystalline polyester to some extent without hindering the fixation. In order to phase-separate the amorphous polyester and the crystalline polyester, increasing the diffusion coefficient of the material and facilitating the formation of a folded structure were considered as means for increasing the degree of crystallinity of the crystalline polyester.

An example of a specific means is to block the ratio of terminal hydroxyl groups and carboxyl groups to the utmost limit and lower the polarity of the crystalline polyester, while trying to reduce the molecular weight of the crystalline polyester, thereby instantly crystallizing the crystalline polyester after the fixing process. However, when the above-mentioned crystalline polyester is simply used, blooming of the crystalline polyester may occur over time, and flakes may be generated on the toner surface.

The mechanism that causes blooming is not clear, but it is conceivable that, first, in the crystalline polyester inside the toner, microcrystals with different orientations aggregate as a mosaic to form a single domain, and this domain of the crystalline polyester is dispersed in the binder resin. It is considered that where the toner is stored for a long period of time under high-temperature and high-humidity conditions, even at a temperature equal to or below the melting point of the crystalline polyester, the microcrystals of the domain of the crystalline polyester migrate in the binder resin over a long period of time (migration). It is also thought that a force is acting that tries to align the orientations of the microcrystals, thereby forming large crystals (crystallization) and enabling stabilization. It is presumed that this movement of the crystalline polyester occasionally causes a phenomenon (blooming) in which huge crystals several microns in length grow outward from the toner.

Accordingly, the present inventors considered that it is important to suppress the movement causing the migration of the crystalline polyester in the toner and also the alignment of the orientation and growth of the crystals, and focused their attention on the structural relationship of the crystalline polyester and the amorphous polyester. As a result, the present inventors found that where the crystalline polyester and the amorphous polyester are each provided with segments of high affinity for each other and segments of low affinity for each other, the relationship between the compatibility and phase separation of the crystalline polyester and the amorphous polyester can be controlled and the desired toner can be obtained.

Specifically, the amorphous polyester and the crystalline polyester are each provided with segments made up of monomers with similar structures. In addition, the amorphous polyester and the crystalline polyester are provided with segments having SP values set apart from each other and low affinity for each other and segments having close SP values and high affinity for each other. Since the amorphous polyester and the crystalline polyester have segments with close SP values and high affinity for each other, the amorphous polyester and the crystalline polyester are compatible to some extent, the crystalline polyester can act as a plasticizer, and low-temperature fixability can be improved. Further, by providing the amorphous polyester and the crystalline polyester with segments having SP values set apart from each other and a low affinity for each other, the degree of crystallinity of the crystalline polyester can be increased and the image heat resistance can be improved.

In addition, since the amorphous polyester and the crystalline polyester have segments of monomers with similar structures, it is possible to suppress the movement that causes the alignment of the orientation and growth of the crystals, and blooming resistance can be improved. Therefore, it was found that a toner exhibiting excellent image heat resistance and blooming resistance, as well as low-temperature fixability is obtained.

The toner has a toner particle including a binder resin.

The binder resin includes an amorphous polyester A and a crystalline polyester C.

The amorphous polyester A has an amorphous polyester segment a1 and an amorphous polyester segment a2. For example, the amorphous polyester A is a block copolymer having the amorphous polyester segment a1 and the amorphous polyester segment a2. The term "block copolymer" as used herein refers to a copolymer in which two kinds of polyesters are bonded to each other.

The amorphous polyester segment a2 has a monomer unit of a linear aliphatic polyhydric alcohol a0 having a carbon number of from 2 to 10 as a monomer unit forming a main skeleton of the amorphous polyester segment a2. The difference between the SP value of the amorphous polyester segment a2 and the SP value of the amorphous polyester segment a1 [(SP value of a2)−(SP value of a1)] is 0.80 $(cal/cm^3)^{0.5}$ or more. "has . . . as a monomer unit forming a main skeleton" means that the monomer is contained as a component constituting the main chain, rather than being contained as a side chain component. The same is true for other components.

Where the amorphous polyester A has the amorphous polyester segment a1 and the amorphous polyester segment a2, a polarity difference can be created in the molecule, and both a segment with a high affinity and a segment with a low affinity for the crystalline polyester C can be realized. As a result, while the binder resin is easily plasticized and excellent low-temperature fixability is obtained, the crystallization rate of the crystalline polyester C is increased, crystallization is efficiently performed in the fixing process of the toner, and excellent heat resistance and pressure resistance are obtained.

In the case in which the amorphous polyester segment a2 of the amorphous polyester A has a monomer unit with the above-described carbon number, when the crystalline polyester C has a monomer unit with a similar carbon number, the amorphous polyester A and the crystalline polyester C have a certain degree of affinity.

Therefore, the crystalline polyester C is supported on the amorphous polyester A, and an excellent blooming resistance effect is obtained.

The carbon number of the linear aliphatic polyhydric alcohol a contained in the amorphous polyester segment a2 is preferably from 2 to 8, more preferably from 2 to 6, still more preferably from 2 to 4, and even more preferably 2. The carbon number of the linear aliphatic polyhydric alcohol a0 contained in the amorphous polyester segment a2 can be controlled by the type of monomer.

In the present disclosure, when a plurality of monomer units is included in the monomer unit for which the carbon number is calculated, the carbon number is the average value of the mole fractions of the monomer units.

Further, when the difference between the SP value of the amorphous polyester segment a2 and the SP value of the amorphous polyester segment a1 is within the above range, a polarity difference in the molecule can be imparted to the amorphous polyester A, and both a segment having a high affinity and a segment having a low affinity for the crystalline polyester C can be realized. As a result, while the binder resin is easily plasticized and excellent low-temperature fixability is obtained, the crystallization rate of the crystalline polyester C is increased, crystallization is efficiently performed in the fixing process of the toner, and excellent heat resistance and pressure resistance can be obtained.

The difference between the SP value of the amorphous polyester segment a2 and the SP value of the amorphous polyester segment a1 [(SP value of a2)−(SP value of a1)] is preferably 1.00 $(cal/cm^3)^{0.5}$ or more, more preferably 1.20 $(cal/cm^3)^{0.5}$ or more. Although the upper limit is not particularly limited, it is preferably 1.80 $(cal/cm^3)^{0.5}$ or less, more preferably 1.60 $(cal/cm^3)^{0.5}$ or less. The difference in SP value between the amorphous polyester segment a1 and the amorphous polyester segment a2 can be controlled by the type of monomer.

The SP value $(cal/cm^3)^{0.5}$ of the amorphous polyester segment a1 is preferably from 10.00 to 11.00, more preferably from 10.20 to 10.40.

The SP value $(cal/cm^3)^{0.5}$ of the amorphous polyester segment a2 is preferably from 11.00 to 12.00, more preferably from 11.50 to 11.80.

The crystalline polyester C is a polymer having a crystalline polyester segment c2 and a crystalline segment c1 bonded to the end of the crystalline polyester segment c2. The crystalline polyester segment c2 has a monomer unit of a linear aliphatic polyhydric alcohol b0 having a carbon number of from 2 to 10 as a monomer unit forming a main skeleton of the crystalline polyester segment c2.

The difference between the SP value of the crystalline polyester segment c2 and the SP value of the crystalline segment c1 [(SP value of c2)−(SP value of c1)] is 0.75 $(cal/cm^3)^{0.5}$ or more.

Where the crystalline polyester C has the crystalline polyester segment c2 and the crystalline segment c1 at the end thereof, a polarity difference can be created in the molecule, and both a segment with a high affinity and a segment with a low affinity for the amorphous polyester A can be realized. As a result, while the binder resin is easily plasticized, and excellent low-temperature fixability is obtained, the crystallization rate of the crystalline polyester is increased, crystallization is efficiently performed in the fixing process of the toner, and excellent heat resistance and pressure resistance are obtained.

When the crystalline polyester segment c2 of the crystalline polyester C has a monomer unit having the above carbon number, it becomes easy to form a folded structure, so that the crystalline polyester C can be crystallized instantaneously after the fixing process, and an effect of excellent heat resistance and pressure resistance can be obtained. The carbon number of the linear aliphatic polyhydric alcohol b0 contained in the crystalline polyester segment c2 is preferably from 2 to 8, more preferably from 2 to 6, still more preferably from 2 to 4, and even more preferably 2. The carbon number of the linear aliphatic polyhydric alcohol b0 contained in the crystalline polyester segment c2 can be controlled by the type of monomer.

Further, when the difference between the SP value of the crystalline polyester segment c2 and the SP value of the crystalline segment c1 [(SP value of c2)−(SP value of c1)] is within the above range, the compatibility of the crystalline polyester C with the amorphous polyester A can be suppressed. Therefore, the degree of crystallinity of the crystalline polyester C can be increased, and an effect of excellent heat resistance and pressure resistance can be obtained.

The difference between the SP value of the crystalline polyester segment c2 and the SP value of the crystalline segment c1 [(SP value of c2)−(SP value of c1)] is preferably 0.80 $(cal/cm^3)^{0.5}$ or more, more preferably 1.00 $(cal/cm^3)^{0.5}$ or more, and even more preferably 1.20 $(cal/cm^3)^{0.5}$ or more. Although the upper limit is not particularly limited, it is preferably 1.50 $(cal/cm^3)^{0.5}$ or less, more preferably 1.30 $(cal/cm^3)^{0.5}$ or less. The difference in SP value between the crystalline segment c1 and the crystalline polyester segment c2 can be controlled by the type of monomer.

The SP value $(cal/cm^3)^{0.5}$ of the crystalline segment c1 is preferably from 8.50 to 9.20, more preferably from 8.60 to 9.00.

The SP value $(cal/cm^3)^{0.5}$ of the crystalline polyester segment c2 is preferably from 9.50 to 10.50, more preferably from 9.80 to 10.20.

The absolute value of the difference between the carbon number of the linear aliphatic polyhydric alcohol a0 and the carbon number of the linear aliphatic polyhydric alcohol b0 is 4 or less.

When the difference in carbon number between the linear aliphatic polyhydric alcohol a0 and the linear aliphatic polyhydric alcohol b0 is within the above range, it indicates that the amorphous polyester A and the crystalline polyester C contain monomer units with similar structures. Therefore, the amorphous polyester A and the crystalline polyester C have a certain degree of affinity, it is possible to suppress the movement that causes the alignment of orientation and growth of the crystals, and an effect of excellent blooming resistance can be obtained.

The difference in carbon number between the linear aliphatic polyhydric alcohol a0 and the linear aliphatic polyhydric alcohol b0 is preferably 2 or less, more preferably 0. The difference in carbon number between the linear aliphatic polyhydric alcohol a0 and the linear aliphatic polyhydric alcohol b0 can be controlled by the type of monomer.

The difference between the SP value of the amorphous polyester segment a1 and the SP value of the crystalline polyester segment c2 [(SP value of a1)−(SP value of c2)] is 0.80 $(cal/cm^3)^{0.5}$ or less.

When the difference in SP value between the amorphous polyester segment a1 and the crystalline polyester segment c2 is within the above range, it indicates that the amorphous polyester A and the crystalline polyester C each have segments with high affinity. Therefore, the compatibility of the crystalline polyester C with the amorphous polyester A can be increased. Therefore, an effect of excellent low-temperature fixability can be obtained.

The difference between the SP value of the amorphous polyester segment a1 and the SP value of the crystalline polyester segment c2 [(SP value of a1)−(SP value of c2)] is preferably 0.70 $(cal/cm^3)^{0.5}$ or less, more preferably 0.60 $(cal/cm^3)^{0.5}$ or less, and still more preferably 0.40 $(cal/cm^3)^{0.5}$ or less. Although the lower limit is not particularly limited, it is 0.10 $(cal/cm^3)^{0.5}$ or more. The difference in SP value between the amorphous polyester segment a1 and the crystalline polyester segment c2 can be controlled by the type of monomer.

The difference between the SP value of the amorphous polyester segment a2 and the SP value of the crystalline segment c1 [(SP value of a2)−(SP value of c1)] is 2.00 $(cal/cm^3)^{0.5}$ or more.

When the difference in SP value between the amorphous polyester segment a2 and the crystalline segment c1 is within the above range, the compatibility of the crystalline polyester C with the amorphous polyester A can be suppressed. Therefore, the degree of crystallinity can be increased, and an effect of excellent heat resistance and pressure resistance can be obtained.

The difference in SP value between the amorphous polyester segment a2 and the crystalline segment c1 [(SP value of a2)−(SP value of c1)] is preferably 2.20 $(cal/cm^3)^{0.5}$ or more, more preferably 2.40 $(cal/cm^3)^{0.5}$ or more. Although the upper limit is not particularly limited, it is preferably 3.50 $(cal/cm^3)^{0.5}$ or less, more preferably 3.00 $(cal/cm^3)^{0.5}$ or less. The difference in SP value between the amorphous polyester segment a2 and the crystalline segment c1 can be controlled by the type of monomer.

The crystalline polyester segment c2 is preferably a condensation polymer of a linear aliphatic polyhydric alcohol b0 and an aliphatic dicarboxylic acid. That is, the crystalline polyester segment c2 preferably has a monomer unit of the linear aliphatic polyhydric alcohol b0 and a monomer unit of an aliphatic dicarboxylic acid. Where the carbon number of the linear aliphatic polyhydric alcohol b0 is denoted by N1 and the carbon number of the aliphatic dicarboxylic acid is denoted by N2, from the viewpoint of image heat resistance, N1 and N2 preferably satisfy the following formula (1).

$$N2/N1 \geq 2.0 \qquad (1)$$

When the difference in the carbon number between the monomers in the crystalline polyester segment c2 is within the above range, the intermolecular interaction can be increased, so the degree of crystallinity can be increased. Therefore, more excellent image heat resistance can be obtained. The N2/N1 relationship can be controlled by the type of monomer. N2/N1 is more preferably 3.0 or more, still more preferably 4.0 or more, and even more preferably 5.0 or more. Although the upper limit is not particularly limited, it is preferably 9.0 or less.

The crystalline segment c1 is, for example, a crystallizable segment that can act like a crystal nucleating agent, and is preferably a monomer unit condensed at the end of the crystalline polyester C.

The crystalline segment c1 is preferably at least one of a monomer unit of an aliphatic monocarboxylic acid and a monomer unit of an aliphatic monoalcohol, more preferably a monomer unit of an aliphatic monocarboxylic acid. The crystalline segment c1 has a hydrocarbon group having a carbon number of from 9 to 30 (preferably from 15 to 25, more preferably from 19 to 23) bonded via an ester bond to the end of the crystalline polyester segment c2. This further improves image heat resistance.

When the crystalline segment c1 is terminal-modified by the crystalline polyester segment c2 with the above carbon number, the crystalline segment c1 tends to become, like the crystal nucleating agent, the starting point of the folded structure of the main chain of the crystalline polyester C. Furthermore, the polarity of the crystalline polyester C itself can be reduced, and the compatibility of the crystalline polyester C with the amorphous polyester A can be suppressed, so that the degree of crystallinity can be increased and more excellent image heat resistance can be obtained.

From the viewpoint of image heat resistance, the content ratio of the structure in which the crystalline segment c1 is bonded to the main chain end of the crystalline polyester segment c2 (terminal-modified structure) in the crystalline polyester C is preferably 60.0 mol % or more, more preferably 80.0 mol % or more, still more preferably 90.0 mol % or more, and even more preferably 95.0 mol % or more. Although the upper limit is not particularly limited, it is preferably 100.0 mol % or less, 99.9 mol % or less, and 99.0 mol % or less.

The content ratio of the terminal-modified structure can be controlled by the addition amount of the terminal-modified aliphatic monocarboxylic acid or aliphatic monoalcohol.

When the hydroxy group and/or carboxy group at the end of the main chain in the crystalline polyester C is modified at the above ratio, it indicates that the highly polar functional group is modified. Therefore, the compatibility of the crystalline polyester C with the amorphous polyester A, which is the main binder, can be suppressed, so that the degree of crystallinity can be increased, and more excellent image heat resistance can be obtained.

The absolute value of the difference between the carbon number of the linear aliphatic polyhydric alcohol a0 and the carbon number of the linear aliphatic polyhydric alcohol b0 is preferably 0 from the viewpoint of blooming resistance.

When the amorphous polyester A and the crystalline polyester C include monomer units of linear aliphatic polyhydric alcohols with the same carbon number, the affinity of the segments increases. Therefore, the amorphous polyester A and the crystalline polyester C have a certain degree of affinity, the movement that causes the alignment of orientation and growth of the crystals can be suppressed, and a more excellent effect of resistance to blooming can be obtained.

From the viewpoint of low-temperature fixability, it is preferable that the amorphous polyester segment a1 has a monomer unit of a polyhydric aromatic phenol.

When the amorphous segment a1 has a monomer unit of a polyhydric aromatic phenol, the affinity between the amorphous polyester A and the crystalline polyester C can be further increased. Therefore, at the time of fixing, the melted crystalline polyester C is compatible with the amorphous polyester A, and a more excellent effect of low-temperature fixability can be obtained.

For the toner, the softening point of the amorphous polyester A measured by a flow tester is denoted by $T_A$ (° C.). The softening point of a melted mixture obtained by mixing the amorphous polyester A and the crystalline polyester C at a mass ratio of the amorphous polyester A and the crystalline polyester C in the toner is denoted by $T_M$ (° C.). The difference ($T_A-T_M$) between the $T_A$ and the $T_M$ is preferably from 7° C. to 20° C. from the viewpoint of low-temperature fixability.

When the difference between $T_A$ and $T_M$ is within the above range, the melted crystalline polyester C is compatible with the amorphous polyester A at the time of fixing, so that a more excellent effect of low-temperature fixability can be obtained.

The difference between $T_A$ and $T_M$ is preferably from 8° C. to 20° C., more preferably from 10° C. to 20° C. The difference between $T_A$ and $T_M$ can be controlled by the amount of crystalline polyester added and the SP value.

Where a storage elastic modulus at 60° C. when the temperature is increased in measurement of a storage elastic modulus G' of the toner is defined as a temperature-increase G' and a storage elastic modulus at 60° C. when the temperature is decreased is defined as a temperature-decrease G', from the viewpoint of heat resistance and pressure resistance, it is preferable that (temperature-increase G')/(temperature-decrease G') is 3.0 or more.

When the (temperature-increase G')/(temperature-decrease G') is within the above range, while the amorphous polyester A and the crystalline polyester C have a certain degree of affinity and the degree of crystallinity is high, the melted crystalline polyester C shows compatibility with the amorphous polyester A at the time of fixing. Therefore, a more excellent effect of heat resistance and pressure resistance can be obtained. The (temperature-increase G')/(temperature-decrease G') is preferably 5.0 or more, more preferably 7.0 or more. Although the upper limit is not particularly limited, it is preferably 15.0 or less, more preferably 13.0 or less, and still more preferably 11.0 or less. The storage modulus G' can be controlled by the amount of crystalline polyester added and the SP value.

A preferable toner configuration is described in detail below.

Amorphous Polyester A

Examples of the monomers used for the amorphous polyester segment a1 and the amorphous polyester segment a2 of the amorphous polyester A include the following monomers in addition to the linear aliphatic polyhydric alcohols a having a carbon number of from 2 to 10.

Polyhydric alcohols (dihydric or trihydric or higher alcohols), polyvalent carboxylic acids (divalent or trivalent or higher carboxylic acid), acid anhydrides thereof or lower alkyl esters thereof can be used.

As the polyhydric alcohol monomer, the following polyhydric alcohol monomers can be used.

Dihydric alcohol components, for example, ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and also bisphenol represented by formula (A) and derivatives thereof;

(A)

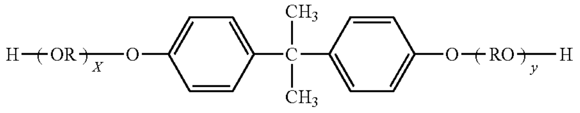

(In the formula, R is an ethylene group or a propylene group, x and y are each integers of 0 or more, and the average value of x+y is from 0 to 10. )

Diols represented by formula (B).

(B)

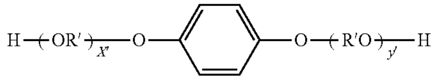

(In the formula, R' is

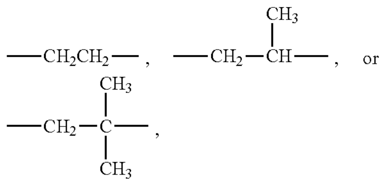

x' and y' are each integers of 0 or more, and the average value of x'+y' is from 0 to 10)

Examples of trihydric or higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane, and pentaerythritol are preferably used. These dihydric alcohols and trihydric or higher alcohols can be used alone or in combination.

The following polyvalent carboxylic acid monomers can be used as the polyvalent carboxylic acid monomer of the polyester resin.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Among these, maleic acid, fumaric acid, terephthalic acid and n-dodecenylsuccinic acid are preferably used.

Examples of trivalent or higher carboxylic acids, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof and lower alkyl esters thereof.

Of these, 1,2,4-benzenetricarboxylic acid, that is, trimellitic acid, or a derivative thereof is particularly preferred because of low cost and easy reaction control. These divalent carboxylic acids and the like and trivalent or higher carboxylic acids can be used alone or in combination.

The amorphous polyester A has an amorphous polyester segment a1 and an amorphous polyester segment a2. The amorphous polyester segment a2 has a monomer unit of a linear aliphatic polyhydric alcohol a0 having a carbon number of from 2 to 10 as a unit forming the main skeleton of the amorphous polyester A. Examples of the linear aliphatic polyhydric alcohol a0 having a carbon number of from 2 to 10 include ethylenediol, propanediol, butanediol, pentanediol, hexanediol, heptanediol, octanediol, nonanediol, and decanediol.

The amorphous polyester segment a2 is preferably a condensation polymer of the linear aliphatic polyhydric alcohol a0 and a divalent carboxylic acid component. The content ratio of the monomer unit of the linear aliphatic polyhydric alcohol a0 in the amorphous polyester segment a2, is preferably from 20% by mass to 50% by mass, more preferably from 25% by mass to 40% by mass. The content ratio of the monomer unit of the divalent carboxylic acid component in the amorphous polyester segment a2 is preferably from 50.0% by mass to 80.0% by mass, more preferably 60.0% by mass to 75.0% by mass.

The amorphous polyester segment a1 preferably has a monomer unit of a polyhydric aromatic phenol. The polyhydric aromatic phenol is preferably at least one selected from the group consisting of hydrogenated bisphenol A, bisphenol represented by the formula (A), and derivatives thereof. More preferably, it is at least one selected from the group consisting of alkylene (ethylene or propylene) oxide adducts of bisphenol A represented by the formula (A). The amorphous polyester segment a1 preferably includes from 50.0% by mass to 70.0% by mass, more preferably from 60.0% by mass to 70.0% by mass of the monomer unit of the polyhydric aromatic phenol.

The amorphous polyester segment a1 is preferably a condensation polymer of a divalent carboxylic acid component including a linear aliphatic polyhydric alcohol having a carbon number of from 6 to 14 (preferably from 8 to 12) and a polyvalent aromatic phenol. The content ratio of the monomer unit of the divalent carboxylic acid component including a linear aliphatic polyhydric alcohol having a carbon number of from 6 to 14 in the amorphous polyester segment a1 is preferably from 30.0% by mass to 50.0% by mass, more preferably from 30.0% by mass to 40.0% by mass.

The content ratio of the amorphous polyester segment a1 in the amorphous polyester A is preferably from 70.0% by mass to 95.0% by mass, more preferably from 75.0% by mass to 85.0% by mass. The content ratio of the amorphous polyester segment a2 in the amorphous polyester A is preferably from 5.0% by mass to 30.0% by mass, more preferably from 15.0% by mass to 25.0% by mass.

A method for producing the polyester is not particularly limited, and known methods can be used. For example, a polyester resin is produced by charging the above alcohol monomer and carboxylic acid monomer at the same time and performing polymerization through an esterification reaction or a transesterification reaction, and a condensation reaction. Moreover, the polymerization temperature is not particularly limited, but is preferably in the range of from 180° C. to 290° C. A polymerization catalyst such as a titanium-based catalyst, a tin-based catalyst, zinc acetate, antimony trioxide, germanium dioxide, and the like can be used in the polymerization of the polyester.

In particular, the amorphous polyester A is more preferably a polyester resin polymerized using a tin-based catalyst.

Crystalline Polyester C

The crystalline polyester C is a polymer having a crystalline polyester segment c2 and a crystalline segment c1 bonded to the end of the crystalline polyester segment c2.

Polyhydric alcohols (divalent or trivalent or higher alcohols), polyvalent carboxylic acids (divalent or trivalent or higher carboxylic acids), acid anhydrides thereof, or lower alkyl esters can be used as the monomers to be used for the crystalline polyester segment c2. The crystalline polyester segment c2 is preferably a condensation polymer of a linear aliphatic polyhydric alcohol b0 having a carbon number of from 2 to 10 (preferably from 2 to 6, more preferably from 2 to 4, still more preferably 2) and an aliphatic dicarboxylic acid.

The following polyhydric alcohol monomers can be used as the polyhydric alcohol monomer to be used for the crystalline polyester C. The polyhydric alcohol monomer is not particularly limited but is preferably a chain (more preferably linear) aliphatic diol, for example, ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol, and neopentyl glycol. Among these, linear aliphatic diols such as ethylene glycol, diethylene glycol, 1,4-butanediol and 1,6-hexanediol, and α,ω-diols are particularly preferred.

Polyhydric alcohol monomers other than the above polyhydric alcohols can also be used. Among the polyhydric alcohol monomers, examples of dihydric alcohol monomers include aromatic alcohols such as polyoxyethylenated bisphenol A, polyoxypropylenated bisphenol A, and the like; 1,4-cyclohexanedimethanol; and the like. Among the polyhydric alcohol monomers, examples of trihydric and higher polyhydric alcohol monomers include aromatic alcohols such as 1,3,5-trihydroxymethylbenzene; aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and the like; and the like.

The following polyvalent carboxylic acid monomers can be used as the polyvalent carboxylic acid monomer to be used in the crystalline polyester C. The polycarboxylic acid monomer is not particularly limited but is preferably a chain (more preferably linear) aliphatic dicarboxylic acid.

Specific examples include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid, and itaconic acid, and also anhydrides thereof and hydrolyzed lower alkyl esters thereof.

A polyvalent carboxylic acid other than the above polyvalent carboxylic acid monomers can also be used. Among other polyvalent carboxylic acid monomers, examples of divalent carboxylic acids include aromatic carboxylic acids such as isophthalic acid, terephthalic acid, and the like, aliphatic carboxylic acids such as n-dodecylsuccinic acid and n-dodecenylsuccinic acid, and alicyclic carboxylic acids such as cyclohexanedicarboxylic acid, and the like, and also anhydrides or lower alkyl esters and the like thereof.

Among other carboxylic acid monomers, examples of trivalent or higher polyvalent carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid, pyromellitic acid, and the like, aliphatic carboxylic acids such as 1,2,4-butanetricarboxylic acid, 1,2,5-hexanetricarboxylic acid, 1,3-dicarboxyl-2-methyl-2-methylenecarboxypropane, and the like, anhydrides thereof, and also derivatives such as lower alkyl esters and the like, and the like.

The crystalline polyester C is a polymer having the crystalline polyester segment c2 and the crystalline segment c1 that is bonded to the end of the crystalline polyester segment c2. The crystalline polyester segment c2 has a monomer unit of a linear aliphatic polyhydric alcohol b0 having a carbon number of from 2 to 10 as a unit forming the main skeleton of the crystalline polyester C.

Examples of the linear aliphatic polyhydric alcohol b0 having a carbon number of from 2 to 10 include ethylenediol, propanediol, butanediol, pentanediol, hexanediol, heptanediol, octanediol, nonanediol, and decanediol.

In the crystalline polyester segment c2, the content ratio of the monomer unit of the linear aliphatic polyhydric alcohol b0 having a carbon number of from 2 to 10 (preferably from 2 to 6, more preferably from 2 to 4, still more preferably 2) is preferably from 15.0% by mass to 40.0% by mass, more preferably from 17.0% by mass to 35.0% by mass. The content ratio of the monomer unit of the aliphatic dicarboxylic acid in the crystalline polyester segment c2, is preferably from 60.0% by mass to 85.0% by mass, more preferably from 65.0% by mass to 83.0% by mass.

The content of the crystalline polyester segment c2 in the crystalline polyester C is preferably from 80.0% by mass to 99.0% by mass, more preferably from 90.0% by mass to 98.0% by mass, and still more preferably from 94.0% by mass to 97.0% by mass.

The content ratio of the monomer units constituting the crystalline segment c1 in the crystalline polyester C is preferably from 1.0% by mass to 20.0% by mass, more preferably from 2.0% by mass to 10.0% by mass.

The content ratio of the crystalline polyester C in the binder resin is preferably from 3% by mass to 20% by mass, more preferably from 8% by mass to 15% by mass. Within the above range, the low-temperature fixability, heat and pressure resistance, and blooming resistance are further improved.

The content ratio of the amorphous polyester A in the binder resin is preferably from 80% by mass to 97% by mass, more preferably from 85% by mass to 92% by mass.

The crystalline polyester C can be produced according to a usual polyester synthesis method.

For example, the crystalline polyester segment c2 can be obtained by subjecting the aforementioned carboxylic acid monomer and alcohol monomer to an esterification reaction or a transesterification reaction, and then to a polycondensation reaction in accordance with a conventional method under reduced pressure or while introducing nitrogen gas.

Then, the crystalline polyester C can be obtained by further adding at least one selected from the group consisting of aliphatic monocarboxylic acids having a carbon number of from 10 to 30 (preferably from 15 to 25, more preferably from 19 to 23) and aliphatic monoalcohols (preferably aliphatic monocarboxylic acids) and performing an esterification reaction to form a crystalline segment c1 at the end of the crystalline polyester segment c2.

The above esterification or transesterification reaction can be carried out using, as necessary, a usual esterification catalyst or transesterification catalyst such as sulfuric acid, titanium butoxide, dibutyltin oxide, manganese acetate, magnesium acetate, and the like.

In addition, the above polycondensation reaction can be carried out using a known catalyst such as a usual polymerization catalyst, for example, titanium butoxide, dibutyltin oxide, tin acetate, zinc acetate, tin disulfide, antimony trioxide and germanium dioxide. The polymerization temperature and catalyst amount are not particularly limited, and may be determined as appropriate.

In the esterification or transesterification reaction or polycondensation reaction, a method may be used in which all the monomers are charged at once in order to increase the strength of the crystalline polyester C to be obtained, or a divalent monomer is first reacted in order to reduce the amount of the low-molecular-weight components, and then a trivalent or higher monomer is added and reacted.

Wax

The toner particle may contain wax. The wax is not particularly limited, and known waxes can be used. Examples thereof include:

- hydrocarbon waxes such as low-molecular-weight polyethylene, low-molecular-weight polypropylene, alkylene copolymers, microcrystalline wax, paraffin wax, Fischer-Tropsch wax, and the like;
- oxides of hydrocarbon waxes such as oxidized polyethylene wax and the like or block copolymers thereof;
- waxes mainly composed of fatty acid esters such as carnauba wax and the like;
- partially or wholly deoxidized fatty acid esters such as deoxidized carnauba wax and the like.

Of these, hydrocarbon waxes such as paraffin wax, Fischer-Tropsch wax, and the like, and fatty acid ester waxes such as carnauba wax and the like are preferred from the viewpoint of low-temperature fixability and hot offset resistance of the toner.

From the viewpoint of toner fixation and separability, hydrocarbon waxes are more preferable.

The wax content in the toner particles is preferably from 1.0 part by mass to 20.0 parts by mass with respect to 100 parts by mass of the binder resin. When the wax content is within the above range, the hot offset resistance at high temperatures is further improved.

In addition, from the viewpoint of achieving both toner storage stability and hot offset resistance, it is preferable that the peak temperature of the maximum endothermic peak of the toner satisfy the following.

That is, in the endothermic curve during temperature rise measured by a differential scanning calorimeter (DSC), the peak temperature of the maximum endothermic peak present in the temperature range of from 30° C. to 200° C. is preferably from 50° C. to 110° C.

Colorant

The toner particle may contain a colorant as needed. Examples of colorants include the following. Examples of black colorants include carbon black and those toned black using a yellow colorant, a magenta colorant and a cyan colorant. As the colorant, a pigment may be used alone, or a dye and a pigment may be used in combination. From the viewpoint of image quality of full-color images, it is preferable to use a dye and a pigment together.

The following are examples of pigments for magenta toner. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81: 1, 83, 87, 88, 89, 90, 112, 114, 122, 123, 146, 147, 150, 163, 184, 202, 206, 207, 209, 238, 269, and 282; C. I. Pigment Violet 19; C. I. Vat Red 1, 2, 10, 13, 15, 23, 29, and 35.

The following are examples of dyes for magenta toner. Oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; C. I. Disperse Violet 1; Basic dyes such as C. I. Basic Red 1, 2, 9, 12, 13, 14, 15, 17, 18, 22, 23, 24, 27, 29, 32, 34, 35, 36, 37, 38, 39, and 40; C. I. Basic Violet 1, 3, 7, 10, 14, 15, 21, 25, 26, 27, and 28.

The following are examples of pigments for cyan toner. C. I. Pigment Blue 2, 3, 15:2, 15:3, 15:4, 16, and 17; C. I. Vat Blue 6; C. I. Acid Blue 45, and copper phthalocyanine pigments having a phthalocyanine skeleton substituted with 1 to 5 phthalimidomethyl groups. As a dye for cyan toner, C. I. Solvent Blue 70 can be mentioned.

The following are examples of pigments for yellow toner. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; C. I. Vat Yellow 1, 3, and 20. As a dye for yellow toner, C. I. Solvent Yellow 162 can be mentioned.

These colorants can be used singly or in combination, and also in the form of a solid solution.

The colorant is selected from the standpoint of hue angle, chroma, lightness, lightfastness, OHP transparency, and dispersibility in toner particle.

The content of the colorant is preferably from 0.1 parts by mass to 30.0 parts by mass with respect to the total amount of the resin components.

Charge Control Agent

The toner particle may include a charge control agent as needed. By blending the charge control agent, it becomes possible to stabilize the charge characteristics and control the optimum triboelectric charge quantity according to the development system. As the charge control agent, known ones can be used, but a metal compound of an aromatic carboxylic acid is particularly preferable because it is colorless, has a high charging speed of the toner, and can stably maintain a constant charge quantity.

Examples of negative charging control agents include metal salicylate compounds, metal naphthoate compounds, metal dicarboxylic acid compounds, polymeric compounds having a sulfonic acid or a carboxylic acid in a side chain, polymeric compounds having a sulfonic acid salt or a sulfonic acid ester compound in a side chain, polymeric compounds having a carboxylic acid salt or a carboxylic acid ester in a side chain, boron compounds, urea compounds, silicon compounds, and calixarenes.

The charge control agent may be added internally or externally to the toner particle. The content of the charge control agent is preferably from 0.2 parts by mass to 10.0 parts by mass, more preferably from 0.5 parts by mass to 10.0 parts by mass, based on 100 parts by mass of the binder resin.

Inorganic Fine Particles

The toner may contain inorganic fine particles as needed.

The inorganic fine particles may be added internally to the toner particles, or may be mixed with the toner as an external additive. Examples of inorganic fine particles include fine particles such as silica fine particles, titanium oxide fine particles, alumina fine particles, and composite oxide fine particles thereof. Among inorganic fine particles, silica fine particles and titanium oxide fine particles are preferable for improving flowability and uniformizing charging. The inorganic fine particles are preferably hydrophobized with a hydrophobizing agent such as a silane compound, silicone oil or a mixture thereof.

From the viewpoint of improving flowability, the inorganic fine particles as an external additive preferably have a specific surface area of from 50 $m^2/g$ to 400 $m^2/g$. Further, from the viewpoint of improving durability and stability, the inorganic fine particles as an external additive preferably have a specific surface area of from 10 $m^2/g$ to 50 $m^2/g$. In order to achieve both the improved flowability and the durability and stability, inorganic fine particles having a specific surface area within the above ranges may be used in combination.

The content of the external additive is preferably from 0.1 parts by mass to 10.0 parts by mass with respect to 100 parts by mass of the toner particle. A known mixer such as a Henschel mixer can be used to mix the toner particles and the external additive.

Developer

The toner can be used as a one-component developer, but in order to further improve dot reproducibility and to supply stable images over a long period of time, it is preferable that the toner be mixed with a magnetic carrier and used as a two-component developer.

Generally known magnetic carriers, for example, iron oxide; metal particles such as iron, lithium, calcium, magnesium, nickel, copper, zinc, cobalt, manganese, chromium, and rare earths, alloy particles thereof, and oxide particles thereof; magnetic bodies such as ferrites; magnetic body-dispersed resin carriers (so-called resin carriers) including magnetic bodies and a binder resin that holds the magnetic bodies in a dispersed state; and the like can be used.

When the toner is mixed with a magnetic carrier and used as a two-component developer, the mixing ratio of the magnetic carrier at that time is preferably from 2% by mass to 15% by mass, more preferably from 4% by mass to 13% by mass as the toner concentration in the two-component developer.

Method for Producing Toner Particles

A method for producing toner particles is not particularly limited, and known methods such as a pulverization method (melt-kneading method), emulsion aggregation method, dissolution suspension method, and the like can be used.

The procedure for manufacturing toner using the pulverization method will be described below. The pulverization method includes, for example, a raw material mixing step of mixing the crystalline polyester C and the amorphous polyester A as binder resins and, if necessary, other components such as wax, colorant, charge control agent, and the like, a step of melt-kneading the mixed raw materials to obtain a resin composition, and a step of pulverizing the obtained resin composition to obtain toner particles.

In the raw material mixing step, as materials constituting the toner particle, for example, a binder resin, and if necessary, other components such as a wax, a colorant, and a charge control agent are weighed in predetermined amounts, blended, and mixed. Examples of the mixing device include a double-cone mixer, a V-type mixer, a drum-type mixer, a super mixer, a Henschel mixer, a Nauta mixer, and Mechanohybrid (manufactured by Nippon Coke & Eng. Co., Ltd.).

Next, the mixed materials are melt-kneaded to disperse the materials in the binder resin. In the melt-kneading step, a batch type kneader such as a pressure kneader or a Banbury mixer, or a continuous kneader can be used, and single-screw or twin-screw extruders are the mainstream since they are superior in terms of enabling continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp), a twin-screw extruder (manufactured by K.C.K. Corp.), a co-kneader (manufactured by Buss Co., Ltd.), Kneedex (manufactured by Nippon Coke & Eng. Co., Ltd.), and the like. Furthermore, the resin composition obtained by melt-kneading may be rolled with two rolls or the like and cooled with water or the like in a cooling step.

Then, the cooled resin composition is pulverized to a desired particle size in a pulverization step. In the pulverization step, for example, coarse pulverization is performed using a pulverizer such as a crusher, hammer mill, or feather mill. After that, fine pulverization is performed with, for example, a Kryptron System (manufactured by Kawasaki Heavy Industries Co., Ltd.), a Super Rotor (manufactured by Nisshin Engineering Inc.), a Turbo Mill (manufactured by Turbo Kogyo Co., Ltd.) or an air jet type fine pulverizer.

After that, if necessary, classification is performed using a classifier or a sieving machine such as Elbow Jet of an inertial classification system (manufactured by Nittetsu Mining Co., Ltd.), Turboplex of a centrifugal force classification system (manufactured by Hosokawa Micron Corporation), TSP Separator (manufactured by Hosokawa Micron Corporation), and Faculty (manufactured by Hosokawa Micron Corporation).

The obtained toner particles may be used as the toner as they are. If necessary, an external additive may be added to the surface of the toner particles to obtain the toner.

As a method for externally adding an external additive, classified toner and various known external additives may be blended in predetermined amounts and stirred and mixed using a mixing device such as a double-cone mixer, a V-type mixer, a drum mixer, a super mixer, a Henschel mixer, a Nauta mixer, a Mechanohybrid mixer (manufactured by Nippon Coke & Eng. Co., Ltd.) or Nobilta (manufactured by Hosokawa Micron Corporation) as an external addition device.

Methods for measuring various physical properties are explained below.

Method for Separating Each Material from Toner

Each material can be separated from the toner by using the difference in solubility of each material contained in the toner.

First separation: the toner is dissolved in methyl ethyl ketone (MEK) at 23° C., and the soluble fraction (amorphous polyester A) and the insoluble fraction (crystalline polyester C, wax, colorant, inorganic fine particles, and the like) are separated.

Second separation: the insoluble fraction (crystalline polyester C, wax, colorant, inorganic fine particles, and the like) obtained in the first separation is dissolved in MEK at 100° C., and the soluble fraction (crystalline polyester C, wax) and the insoluble fraction (colorant, inorganic fine particles, and the like) are separated.

Third separation: the soluble fraction (crystalline polyester C, wax) obtained in the second separation is dissolved in chloroform at 23° C. to separate the soluble fraction (crystalline polyester C) and the insoluble fraction (wax).

Method for Measuring Content Ratio of Monomer Units of Various Polymerizable Monomers in Amorphous Polyester A and Crystalline Polyester C The content ratio of monomer units of various polymerizable monomers in the amorphous polyester A and the crystalline polyester C is measured by $^1$H-NMR under the following conditions.

Measurement device: FT NMR device JNM-EX400 (manufactured by JEOL Ltd.)
Measurement frequency: 400 MHz
Pulse condition: 5.0 μs
Frequency range: 10,500 Hz
Accumulated times: 64 times
Measurement temperature: 30° C.
Sample: prepared by putting 50 mg of a measurement sample into a sample tube with an inner diameter of 5 mm, adding deuterated chloroform ($CDCl_3$) as a solvent, and dissolving the sample in a thermostat at 40° C.

From the obtained $^1$H-NMR chart, integral values $S_1$, $S_2$, $S_3$, . . . $S_n$ of peaks attributed to constituent elements of monomer units of various polymerizable monomers are calculated.

The content ratio of the monomer units of various polymerizable monomers is obtained in the following manner using the integral values $S_1$, $S_2$, $S_3$, and $S_n$. $n_1$, $n_2$, $n_3$, . . . $n_n$ are numbers of hydrogen atoms in the constituent elements to which the peak focused on each segment are attributed.

$$\text{Content ratio (mol \%) of monomer units of various polymerizable monomers}=\{(S_n/n_n)/((S_1/n_1)+(S_2/n_2)+(S_3/n_3)\ldots+(S_n/n_n))\}\times 100$$

By changing the molecular terms of the same operation, the amount of monomer units of various polymerizable monomers is calculated. In addition, when a polymerizable monomer that does not contain a hydrogen atom is used in the monomer unit of various polymerizable monomers, $^{13}$C-NMR is used to set the atomic nucleus to be measured to $^{13}$C, the measurement is carried out in a single pulse mode, and the calculation is performed in the same manner as in $^1$H-NMR.

SP Value Calculation Method

The SP values of the amorphous polyester segment a1, the amorphous polyester segment a2, the crystalline segment c1, and the crystalline polyester segment c2 are obtained as follows according to the calculation method proposed by Fedors.

Evaporation energy (Δei) (cal/mol) and molar volume (Δvi) ($cm^3$/mol) are obtained from the table described in "Polym. Eng. Sci., 14 (2), 147-154 (1974)" for the atom or atomic group in the molecular structure for the monomer unit of each polymerizable monomer, and $(\Sigma\Delta ei/\Sigma\Delta vi)^{0.5}$ is defined as the SP value $(cal/cm^3)^{0.5}$.

Measurement of Weight Average Molecular Weight of Crystalline Polyester C by GPC The weight average molecular weight (Mw) of a 100° C. o-dichlorobenzene-soluble portion of the crystalline polyester C is measured by gel permeation chromatography (GPC) as follows. First, the crystalline polyester C is dissolved in o-dichlorobenzene at 100° C. for 1 h. Then, the obtained solution is filtered through a solvent-resistant membrane filter "Maeshori Disk" (manufactured by Tosoh Corporation) having a pore diameter of 0.2 μm to obtain a sample solution. The sample solution is adjusted so that the concentration of components soluble in o-dichlorobenzene is about 0.1% by mass. This sample solution is used for measurement under the following conditions.

Apparatus: HLC-8121GPC/HT (manufactured by Tosoh Corporation)
Column: TSKgel GMHHR-H HT (7.8 cm I. D×30 cm) 2 rows (manufactured by Tosoh Corporation)
Detector: RI for high temperature
Temperature: 135° C.
Solvent: o-dichlorobenzene
Flow rate: 1.0 mL/min
Sample: 0.4 mL of 0.1% sample is injected A molecular weight calibration curve created from a monodisperse polystyrene standard sample is used to calculate the molecular weight of the sample. Then, calculation is performed by converting to polyethylene using a conversion formula derived from the Mark-Houwink viscosity formula.

Method for Measuring Acid Value of Crystalline Polyester C

The acid value is the number of milligrams of potassium hydroxide required to neutralize the acid contained in 1 g of sample.

The acid value of the crystalline polyester C is measured according to JIS K 0070-1992, and specifically, it is measured according to the following procedure.

(1) Preparation of Reagents

A total of 1.0 g of phenolphthalein is dissolved in 90 mL of ethyl alcohol (95% by volume), ion-exchanged water is added to make 100 mL, and a phenolphthalein solution is obtained. A total of 7 g of special grade potassium hydroxide is dissolved in 5 mL of water, and ethyl alcohol (95% by volume) is added to make 1 L. The solution is placed in an alkali-resistant container and allowed to stand for 3 days so as not to come into contact with carbon dioxide gas and the like, and then filtered to obtain a potassium hydroxide solution. The resulting potassium hydroxide solution is stored in an alkali-resistant container. A total of 25 mL of 0.1 mol/L hydrochloric acid is taken in an Erlenmeyer flask, a few drops of the phenolphthalein solution are added, titration is performed with the potassium hydroxide solution, and the potassium hydroxide solution factor is obtained from the amount of the potassium hydroxide solution required for neutralization. The 0.1 mol/L hydrochloric acid used is prepared according to JIS K 8001-1998.

(2) Operation (A) Main Test

A 2.0 g sample of the pulverized crystalline polyester C is precisely weighed in a 200 mL Erlenmeyer flask, 100 mL of a mixed solution of toluene/ethanol (2:1) is added, and dissolution is performed over 5 h.

A few drops of the phenolphthalein solution are then added as an indicator, and the potassium hydroxide solution is used for titration. The end point of titration is when the light red color of the indicator continues for 30 sec.

(B) Blank Test

The same titration as in the above operation is performed, except that no sample is used (that is, only a mixed solution of toluene/ethanol (2:1) is used).

(3) The acid value is calculated by substituting the obtained result into the following formula.

$$A=[(C-B)\times f\times 5.61]/S$$

Here, A: acid value (mg KOH/g), B: added amount of potassium hydroxide solution for blank test (mL), C: added amount of potassium hydroxide solution for main test (mL), f: potassium hydroxide solution factor, S: mass of sample (g).

Method for Measuring Hydroxyl Value of Crystalline Polyester C

The hydroxyl value is the number of milligrams of potassium hydroxide required to neutralize acetic acid bound to a hydroxyl group when acetylating 1 g of the sample. The hydroxyl value of the crystalline polyester is measured according to JIS K 0070-1992, and specifically, it is measured according to the following procedure.

(1) Preparation of Reagents

A total of 25 g of special grade acetic anhydride is put into a 100 mL volumetric flask, pyridine is added to bring the total amount to 100 mL, and the system is shaken well to obtain an acetylation reagent. The obtained acetylation reagent is stored in a brown bottle so as not to come into contact with moisture, carbon dioxide gas, and the like.

A total of 1.0 g of phenolphthalein is dissolved in 90 mL of ethyl alcohol (95% by volume), ion-exchanged water is added to make 100 mL, and a phenolphthalein solution is obtained.

A total of 35 g of special grade potassium hydroxide is dissolved in 20 mL of water, and ethyl alcohol (95% by volume) is added to make 1 L. The solution is put in an alkali-resistant container and allowed to stand for 3 days so as not to come into contact with carbon dioxide gas and the like, and then filtered to obtain a potassium hydroxide solution. The resulting potassium hydroxide solution is stored in an alkali-resistant container. A total of 25 mL of 0.5 mol/L hydrochloric acid is taken in an Erlenmeyer flask, a few drops of the phenolphthalein solution are added, titration is performed with the potassium hydroxide solution, and the potassium hydroxide solution factor is obtained from the amount of the potassium hydroxide solution required for neutralization. The 0.5 mol/L hydrochloric acid used is prepared according to JIS K 8001-1998.

(2) Operation (A) Main Test

A 1.0 g sample of pulverized crystalline polyester C is precisely weighed in a 200 mL round-bottomed flask, and 5.0 mL of the above acetylating reagent is accurately added thereto using a whole pipette. At this time, where the sample is difficult to dissolve in the acetylation reagent, a small amount of special grade toluene is added for dissolution.

A small funnel is placed on the mouth of the flask, immersed about 1 cm of the bottom of the flask in a glycerin bath at about 97° C. and heated. At this time, in order to prevent the temperature of the neck of the flask from rising due to the heat received from the bath, it is preferable to cover the base of the neck of the flask with a piece of cardboard with a round hole.

After 1 h, the flask is removed from the glycerin bath and allowed to cool. After cooling, 1 mL of water is added through the funnel, and the flask is shaken to hydrolyze the acetic anhydride. For more complete hydrolysis, the flask is again heated in the glycerin bath for 10 min. After cooling, the walls of the funnel and flask are washed with 5 mL of ethyl alcohol.

A few drops of the phenolphthalein solution as an indicator are added, and titration is performed with the potassium hydroxide solution. The end point of titration is when the light red color of the indicator continues for about 30 sec.

(B) Blank Test

The same titration as in the above operation is performed, except that the crystalline polyester sample is not used.

(3) The hydroxyl value is calculated by substituting the obtained result into the following formula.

$$A=[\{(B-C)\times 28.05\times f\}/S]+D$$

Here, A: hydroxyl value (mg KOH/g), B: added amount of potassium hydroxide solution for blank test (mL), C: added amount of potassium hydroxide solution for main test (mL), f: potassium hydroxide solution factor, S: sample (g), D: acid value of crystalline polyester (mg KOH/g).

Method for Calculating Content Ratio of Structure in Which Crystalline Segment c1 in Crystalline Polyester C is Bonded to Main Chain End of Crystalline Polyester Segment c2 (Content Ratio of Terminal-Modified Structure)

The ratio of the terminal-modified structure of the crystalline polyester C is calculated using the acid value, hydroxyl value, and molecular weight obtained above. Specifically, the number of moles of terminal functional groups in 1 g of crystalline polyester C is calculated using the following formula.

Number of moles of terminal functional groups=(acid value+hydroxyl value)/(1000×56.105)

Next, the number of moles of 1 g of the crystalline polyester C is calculated from the molecular weight of the crystalline polyester C.

The number of moles of 1 g of crystalline polyester C=1/Mw.

The amount of terminal functional groups is calculated from the ratio of each monomer unit of the crystalline polyester C calculated by the above NMR. Specifically, in the case of an ester product of a dicarboxylic acid and a dialcohol, the amount of functional groups is set to 2. Where a monomer having a valence of 3 or higher is used, the amount of terminal functional groups can be calculated from the molar ratio.

Ratio (mol %) of terminal-modified structure of crystalline polyester $C$=[1−(number of moles of terminal functional groups)/((number of moles of 1 g of crystalline polyester)×(amount of functional groups))]×100.

Measurement of Softening Points $T_A$ and $T_M$

The softening points $T_A$ and $T_M$ are measured using a constant load extrusion type capillary rheometer "flow characteristic evaluation device, flow tester CFT-500D" (manufactured by Shimadzu Corporation) according to the manual provided with the device. With this device, while a constant load is applied from the top of the measurement sample with a piston, the temperature of the measurement sample filled in the cylinder is increased to melt the sample, and the molten measurement sample is extruded from a die at the bottom of the cylinder. A flow curve can thus be obtained showing the relationship between the piston descent amount at this time (mm) and temperature (° C.).

The "melting temperature in the ½ method" described in the manual provided with the "flow characteristic evaluation device, flow tester CFT-500D" is taken as the softening temperature. The melting temperature in the ½ method is calculated as follows. First, ½ of the difference between the piston descent amount (Smax) when the outflow ends and the piston descent amount (Smin) when the outflow starts is found (this is X; X=(Smax−Smin)/2). The temperature at which the piston descent amount in the flow curve is the sum of X and Smin is the melting temperature in the ½ method.

A cylindrical sample having a diameter of 8 mm that is prepared by compressing 1.2 g of the sample at 10 MPa for 60 sec in an environment of 25° C. using a tablet press (for example, standard manual Newton press NT-100H, manufactured by NPA Systems Co., Ltd.) is used.

Specific operations for measurement are performed according to the manual provided with the device.

The measurement conditions for CFT-500D are as follows.

Test mode: temperature rise method
Start temperature: 60° C.
Achieved temperature: 200° C.
Measurement interval: 1.0° C.
Heating rate: 4.0° C./min
Piston cross-sectional area: 1.000 $cm^2$
Test load (piston load): 5.0 kgf
Preheating time: 300 sec
Die hole diameter: 1.0 mm
Die length: 1.0 mm Measurement of $T_M$ The mass ratio of the amorphous polyester A and the crystalline polyester C in the toner is calculated from the mass of each material obtained by separating the materials described above. The softening point $T_M$ is obtained by using as a sample a mixture of the amorphous polyester A and the crystalline polyester C, which have been separated from the toner by the above procedure, at the calculated mass ratio.

Method for Measuring Storage Modulus (Temperature-Increase G')/(Temperature-Decrease G')

A rotating plate rheometer "ARES" (manufactured by TA Instruments Co.) is used as a measuring device. A sample prepared by using 0.2 g of toner and compression molding for 60 sec into a disk having a diameter of 8 mm and a thickness of 2.0±0.3 mm under 10 MPa by using a tablet press under an environment of 25° C. is used as a sample to be measured.

The molded sample is mounted on a parallel plate, the temperature is raised from room temperature (25° C.) to 110° C. in 15 min, the sample is shaped and then cooled to the measurement start temperature and measurement is started. At this time, it is important to set the sample so that the initial normal force is zero. Also, as described below, in subsequent measurements, the influence of the normal force can be canceled by setting the automatic tension adjustment to (Auto Tension Adjustment ON).

The measurement is performed under the following conditions, and the storage elastic modulus at 60° C. in the process of increasing the temperature is defined as the temperature-increase G', and the storage elastic modulus at 60° C. in the process of decreasing the temperature is defined as the temperature-decrease G'.

Measurements are performed under the following conditions.

(1) A parallel plate with a diameter of 8 mm is used.
(2) Frequency is set to 6.28 rad/sec (1.0 Hz).
(3) The applied strain initial value (Strain) is set to 0.01%.
(4) Measurement is performed between 30° C. and 150° C. at a temperature increase rate (Ramp Rate) of 2.0° C./min. The measurement is performed under the following setting conditions of an automatic adjustment mode. Measurement is performed in the automatic strain adjustment mode (Auto Strain).
(5) The maximum strain (Max Applied Strain) is set to 40.0%.

(6) The maximum torque (Max Allowed Torque) is set to 150.0 g·cm and the minimum torque (Min Allowed Torque) is set to 0.2 g cm.

(7) The strain adjustment (Strain Adjustment) is set to 1.0% of Current Strain. In the measurement, an automatic tension adjustment mode (Auto Tension) is adopted.

(8) Automatic tension direction (Auto Tension Direction) is set to compression (Compression).

(9) The initial static force (Initial Static Force) is set to 10.0 g and the automatic tension sensitivity (Auto Tension Sensitivity) is set to 40.0 g.

(10) The operating conditions for automatic tension (Auto Tension) are that the sample modulus (Sample Modulus) is $1.0\times10^3$ Pa or more.

EXAMPLES

The present invention will be specifically described below with reference to examples, but these are not intended to limit the present invention in any way. In addition, in the following formulations, parts are based on mass unless otherwise specified.

Example 1

Production of Amorphous Polyester Segment a1-1

Polyhydric alcohol: polyoxypropylene (2.2)-2,2-bis(4-hydroxyphenyl)propane 65 parts Polyvalent carboxylic acid: tetradodecanedioic acid 35 parts The abovementioned monomer components were loaded in a reaction vessel equipped with a stirring device that was sufficiently heated and dried, 0.05 parts of titanium tetrabutoxide was added to 100 parts of the mixture, nitrogen gas was introduced into the vessel, the temperature was raised to 260° C. while maintaining the inactive atmosphere, and an amorphous polyester segment a1-1 was polymerized.

Production of Amorphous Polyester Segments a1-2 to a1-4

Amorphous polyester segments a1-2 to a1-4 were produced by the same production process as in the production example of the amorphous polyester segment a1-1, except that the types and amounts of the polyhydric carboxylic acid monomer and the polyhydric alcohol monomer were changed to those shown in Table 1.

TABLE 1

| Amorphous polyester | Polyhydric alcohol | | | Polyvalent carboxylic acid | | | | | |
|---|---|---|---|---|---|---|---|---|---|
| segment a1 | Type | Parts | mol % | Type | Parts | mol % | Type | Parts | mol % |
| a1-1 | BPA-PO | 65.0 | 51.0 | TDA | 35.0 | 49.0 | — | — | — |
| a1-2 | BPA-PO | 65.0 | 48.1 | DDA | 35.0 | 51.9 | — | — | — |
| a1-3 | BPA-EO | 70.0 | 50.1 | SA | 30.0 | 49.9 | — | — | — |
| a1-4 | BPA-EO | 70.0 | 55.8 | TPA | 2.0 | 4.4 | TDA | 28.0 | 39.8 |

The abbreviations in Table 1 are as follows

BPA-PO: bisphenol A propylene oxide adduct

BPA-EO: bisphenol A ethylene oxide adduct

TDA: tetradecanedioic acid

DDA: dodecanedioic acid

SA: suberic acid

TPA: terephthalic acid

Production of Amorphous Polyester Segment a2-1

Polycarboxylic acid: terephthalic acid 73 parts

Linear aliphatic polyhydric alcohol a0: ethylenediol 27 parts

The abovementioned monomer components were loaded in a reaction vessel equipped with a stirring device that was sufficiently heated and dried, 0.05 parts of titanium tetrabutoxide was added to 100 parts of the mixture, nitrogen gas was introduced into the vessel, the temperature was raised to 260° C. while maintaining the inactive atmosphere, and an amorphous polyester segment a2-1 was polymerized.

Production of Amorphous Polyester Segments a2-2 to a2-4

Amorphous polyester segments a2-2 to a2-4 were produced by the same production process as in the production example of the amorphous polyester segment a2-1, except that the types and amounts of the polyhydric carboxylic acid monomer and the polyhydric alcohol monomer were changed to those shown in Table 2.

TABLE 2

| Amorphous polyester | Polyvalent carboxylic acid | | | Linear aliphatic polyhydric alcohol a0 | | |
|---|---|---|---|---|---|---|
| segment a2 | Type | Parts | mol % | Type | Parts | mol % |
| a2-1 | TPA | 73.0 | 50.3 | ED | 27.0 | 49.7 |
| a2-2 | TPA | 65.0 | 50.2 | BD | 35.0 | 49.8 |
| a2-3 | TPA | 60.0 | 51.6 | HD | 40.0 | 48.4 |
| a2-4 | TPA | 45.0 | 49.9 | DD | 55.0 | 50.1 |

The abbreviations in Table 2 are as follows

TPA: terephthalic acid

ED: ethylenediol (ethylene glycol)

BD: butanediol

HD: hexanediol

DD: dodecanediol

Production Example of Amorphous Polyester A1

Amorphous polyester segment a1-1: 80 parts

Amorphous polyester segment a2-1: 20 parts

The above materials were loaded into a reactor equipped with a cooling pipe, a stirrer, a nitrogen introduction pipe, and a thermocouple.

Then, 1.0 part of tin 2-ethylhexanoate (esterification catalyst) was added as a catalyst to 100 parts of the total amount of the segments. Next, after the inside of the flask was replaced with nitrogen gas, the temperature was gradually raised while stirring, and the reaction was carried out for 2.5 h while stirring at a temperature of 200° C. Furthermore, the pressure in the reaction vessel was lowered to 8.3 kPa and maintained for 1 h, followed by cooling to 180° C. and return to atmospheric pressure (first reaction step).

Trimellitic anhydride: 0.04 parts tert-Butyl catechol (polymerization inhibitor): 0.1 parts After that, the above materials were added, the pressure in the reactor was lowered to 8.3 kPa, the reaction was conducted for 15 h while maintaining the temperature at 160° C., and after it was confirmed that the softening point of the reaction product measured according to ASTM D36-86 reached 140° C., the temperature was lowered to terminate the reaction (second reaction step). Thus, an amorphous polyester A1 was obtained.

Production of Amorphous Polyesters A2 to A7

Amorphous polyesters A2 to A7 were obtained in the same manner as in the production example of the amorphous polyester A1, except that the types and amounts of amorphous polyester segments a1 and a2 were changed to those shown in Table 3.

Table 4 shows the physical properties of the amorphous polyesters A2 to A7.

TABLE 3

| Amorphous | Amorphous polyester segment a1 | | Amorphous polyester segment a2 | |
|---|---|---|---|---|
| polyester A | Type | Parts | Type | Parts |
| 1 | a1-1 | 80.0 | a2-1 | 20.0 |
| 2 | a1-1 | 75.0 | a2-2 | 25.0 |
| 3 | a1-2 | 80.0 | a2-1 | 20.0 |
| 4 | a1-4 | 90.0 | a2-1 | 10.0 |
| 5 | a1-3 | 75.0 | a2-1 | 25.0 |
| 6 | a1-1 | 75.0 | a2-3 | 25.0 |
| 7 | a1-1 | 70.0 | a2-4 | 30.0 |
| 8 | — | — | a2-1 | 100.0 |

TABLE 4

| Amorphous | Amorphous polyester segment a1 | | Amorphous polyester segment a2 | | Difference between SP |
|---|---|---|---|---|---|
| polyester A | Type | SP value | Type | SP value | values |
| 1 | a1-1 | 10.31 | a2-1 | 11.74 | 1.43 |
| 2 | a1-1 | 10.31 | a2-2 | 11.21 | 0.90 |
| 3 | a1-2 | 10.39 | a2-1 | 11.21 | 0.81 |
| 4 | a1-4 | 10.50 | a2-1 | 11.74 | 1.24 |
| 5 | a1-3 | 10.83 | a2-1 | 11.21 | 0.38 |
| 6 | a1-1 | 10.31 | a2-3 | 10.83 | 0.52 |
| 7 | a1-1 | 10.31 | a2-4 | 10.15 | −0.16 |
| 8 | — | — | a2-1 | 11.74 | — |

In Table 4, the difference between SP values is the difference (a2−a1) between the SP value of the amorphous polyester segment a2 and the SP value of the amorphous polyester segment a1. The unit of the SP value is $(cal/cm^3)^{0.5}$.

Production of Crystalline Polyester Segment c2-1

Linear aliphatic polyhydric alcohol b0: ethylenediol 20 parts

Aliphatic dicarboxylic acid: dodecanedioic acid 80 parts

The abovementioned monomer components were loaded in a reaction vessel equipped with a stirring device that was sufficiently heated and dried, 0.05 parts of titanium tetrabutoxide was added to 100 parts of the mixture, nitrogen gas was introduced into the vessel, the temperature was raised to 260° C. while maintaining the inactive atmosphere, and an crystalline polyester segment c2-1 was polymerized.

Production of Crystalline Polyester Segments c2-2 to c2-5

Crystalline polyester segments c2-2 to c2-5 were produced by the same production process as in the production example of the crystalline polyester segment c2-1, except that the types and amounts of linear aliphatic polyhydric alcohol b0 and the aliphatic dicarboxylic acid were changed to those shown in Table 5.

TABLE 5

| Crystalline polyester | Linear aliphatic polyhydric alcohol b0 | | | Aliphatic dicarboxylic acid | | |
|---|---|---|---|---|---|---|
| segment c2 | Type | Parts | mol % | Type | Parts | mol % |
| c2-1 | ED | 20.0 | 49.2 | DDA | 80.0 | 50.8 |
| c2-2 | HD | 33.0 | 50.0 | DDA | 67.0 | 50.0 |
| c2-3 | OD | 37.0 | 49.1 | DDA | 63.0 | 50.9 |
| c2-4 | BD | 27.0 | 49.7 | DDA | 73.0 | 50.3 |
| c2-5 | DD | 45.0 | 49.3 | DDA | 55.0 | 50.7 |

The abbreviations in Table 5 are as follows

ED: ethylenediol

HD: hexanediol

OD: octanediol

BD: butanediol

DD: dodecanediol

DDA: dodecanedioic acid

Production Example of Crystalline Polyester C1

Crystalline segment c1: behenic acid 4 parts

Crystalline polyester segment c2-1: 96 parts

Esterification catalyst: titanium tetrabutoxide 0.5 parts

The above materials were weighed into a reactor equipped with a cooling tube, a stirrer, a nitrogen introduction tube, and a thermocouple.

Next, after the inside of the flask was replaced with nitrogen gas, the temperature was gradually raised while stirring, and the reaction was carried out for 2 h while stirring at a temperature of 200° C.

Furthermore, the pressure in the reaction tank was lowered to 8.3 kPa, the reaction was carried out for 5 h while maintaining the temperature at 200° C., and then the temperature was lowered to terminate the reaction and obtain the crystalline polyester C1.

Production Example of Crystalline Polyesters C2 to C14

The reaction was carried out in the same manner as in the production example of crystalline polyester C1, except that the type and number of parts of crystalline segment c1 and crystalline polyester segment c2 were changed as shown in Table 6 to obtain crystalline polyesters C2 to C14. Table 7 shows the physical properties of the crystalline polyesters C2 to C14.

TABLE 6

| Crystalline | Crystalline segment c1 | | | Crystalline polyester segment c2 | | |
|---|---|---|---|---|---|---|
| polyester C | Type | Parts | mol % | Type | Parts | mol % |
| 1 | BA | 4.0 | 68.9 | c2-1 | 96.0 | 31.1 |
| 2 | BA | 13.0 | 88.8 | c2-1 | 87.0 | 11.2 |
| 3 | BA | 17.0 | 91.6 | c2-1 | 83.0 | 8.4 |

TABLE 6-continued

| Crystalline | Crystalline segment c1 | | | Crystalline polyester segment c2 | | |
|---|---|---|---|---|---|---|
| polyester C | Type | Parts | mol % | Type | Parts | mol % |
| 4 | DA | 2.0 | 68.2 | c2-1 | 98.0 | 31.8 |
| 5 | NA | 2.0 | 70.0 | c2-1 | 98.0 | 30.0 |
| 6 | MA | 5.0 | 67.7 | c2-1 | 95.0 | 32.3 |
| 7 | DKA | 5.0 | 66.4 | c2-1 | 95.0 | 33.6 |
| 8 | BA | 4.0 | 68.9 | c2-2 | 96.0 | 31.1 |
| 9 | BA | 4.0 | 68.9 | c2-3 | 96.0 | 31.1 |
| 10 | HA | 2.0 | 76.1 | c2-4 | 98.0 | 23.9 |
| 11 | HA | 2.0 | 76.1 | c2-1 | 98.0 | 23.9 |
| 12 | BA | 4.0 | 68.9 | c2-3 | 96.0 | 31.1 |
| 13 | MA | 5.0 | 67.7 | c2-5 | 95.0 | 32.3 |
| 14 | — | — | — | c2-1 | 100.0 | 100.0 |

The abbreviations in Table 6 are as follows
BA: behenic acid
DA: decanoic acid
NA: nonanoic acid
MA: melissic acid
DKA: dotriacontanoic acid
HA: hexanoic acid

TABLE 7

| Crystalline | Crystalline segment c1 | | Crystalline polyester segment c2 | | Difference between | Ratio of carbon numbers | Terminal modification |
|---|---|---|---|---|---|---|---|
| polyester C | Type | SP value | Type | SP value | SP values | N2/N1 | ratio |
| 1 | BA | 8.82 | c2-1 | 9.97 | 1.15 | 6.0 | 98.5% |
| 2 | BA | 8.82 | c2-1 | 9.97 | 1.15 | 6.0 | 63.0% |
| 3 | BA | 8.82 | c2-1 | 9.97 | 1.15 | 6.0 | 57.0% |
| 4 | DA | 9.08 | c2-1 | 9.97 | 0.89 | 6.0 | 98.5% |
| 5 | NA | 9.13 | c2-1 | 9.97 | 0.84 | 6.0 | 98.5% |
| 6 | MA | 8.75 | c2-1 | 9.97 | 1.22 | 6.0 | 98.5% |
| 7 | DKA | 8.74 | c2-1 | 9.97 | 1.23 | 6.0 | 97.0% |
| 8 | BA | 8.82 | c2-2 | 9.67 | 0.85 | 1.5 | 98.5% |
| 9 | BA | 8.82 | c2-3 | 9.57 | 0.75 | 1.5 | 98.5% |
| 10 | HA | 9.36 | c2-4 | 9.80 | 0.45 | 3.0 | 98.5% |
| 11 | HA | 9.36 | c2-1 | 9.97 | 0.61 | 6.0 | 98.5% |
| 12 | BA | 8.82 | c2-3 | 9.57 | 0.75 | 1.5 | 98.5% |
| 13 | MA | 8.75 | c2-5 | 9.45 | 0.70 | 6.0 | 98.5% |
| 14 | — | — | c2-1 | 9.97 | — | 6.0 | — |

In Table 7, the difference between the SP values indicates the difference (c2–c1) between the SP value of the crystalline polyester segment c2 and the SP value of the crystalline segment c1. The unit of the SP value is $(cal/cm^3)^{0.5}$. The terminal modification ratio is the content ratio (mol %) of the structure in which the crystalline segment c1 is bonded to the main chain end of the crystalline polyester segment c2 in the crystalline polyester C.

Production Example of Toner 1

Amorphous polyester A1: 90 parts

Crystalline polyester C1: 10 parts

Fischer-Tropsch wax (peak temperature of maximum endothermic is 76° C.): 5 parts Carbon black: 10 parts The above materials were mixed using a Henschel mixer (FM-75 type, manufactured by Mitsui Mining Co., Ltd.) at a rotation speed of 1500 rpm and a rotation time of 5 min and then kneaded with a twin-screw kneader (PCM-30 type, manufactured by Ikegai Corp.) set at 130° C. The resulting kneaded product was cooled and coarsely pulverized to 1 mm or less with a hammer mill to obtain a coarsely pulverized product. The obtained coarsely pulverized product was finely pulverized with a mechanical pulverizer (T-250, manufactured by Turbo Kogyo Co., Ltd.). Further, classification was performed using Faculty (F-300, manufactured by Hosokawa Micron Corporation), and toner particles 1 were obtained. The operating conditions were a classification rotor rotation speed of 11,000 rpm and a dispersion rotor rotation speed of 7200 rpm.

Toner particles 1: 100 parts

Silica fine particles A: fumed silica surface-treated with hexamethyldisilazane (the median diameter (D50) on the number basis is 120 nm): 4 parts Small particle size inorganic fine particles: titanium oxide fine particles surface-treated with isobutyltrimethoxysilane (the median diameter (D50) on the number basis is 10 nm): 1 part The above materials were mixed in a Henschel mixer (FM-75 type, manufactured by Mitsui Miike Machinery Co., Ltd.) at a rotation speed of 1900 rpm for a rotation time of 10 min to obtain a negative-charging toner 1.

Production Examples of Toner 2 to Toner 20

Toner 2 to toner 20 were obtained by performing the same operations as in the production example of toner 1, except that the type of the amorphous polyester A and the type of the crystalline polyester C in the production example of toner 1 were changed as shown in Table 8. Table 8 shows the physical properties obtained.

TABLE 8

| | Formulation | | Physical properties | | | | |
|---|---|---|---|---|---|---|---|
| Toner No. | Amorphous polyester A | Crystalline polyester C | Difference in carbon number between a0 between b0 [—] | Difference in SP value between a2 and c2 | Difference in SP value and c1 | Softening point $T_A$-$T_M$ [°C.] | (Temperature-increase G')/(temperature-decrease G') [—] |
| 1 | A1 | C1 | 0 | 0.34 | 2.92 | 11 | 9.9 |
| 2 | A2 | C1 | 0 | 0.34 | 2.39 | 7 | 9.9 |
| 3 | A1 | C2 | 0 | 0.34 | 2.92 | 15 | 7.1 |
| 4 | A1 | C3 | 0 | 0.34 | 2.92 | 18 | 5.6 |
| 5 | A1 | C4 | 0 | 0.34 | 2.66 | 15 | 7.1 |
| 6 | A1 | C5 | 0 | 0.34 | 2.61 | 18 | 5.6 |
| 7 | A1 | C6 | 0 | 0.34 | 2.99 | 7 | 9.9 |
| 8 | A1 | C7 | 0 | 0.34 | 3.00 | 6 | 9.9 |
| 9 | A3 | C8 | 2 | 0.72 | 2.39 | 15 | 7.1 |
| 10 | A2 | C9 | 4 | 0.74 | 2.39 | 20 | 3.0 |
| 11 | A4 | C5 | 0 | 0.53 | 2.61 | 13 | 9.9 |
| 12 | A2 | C10 | 0 | 0.51 | 1.85 | 21 | 2.9 |
| 13 | A5 | C1 | 0 | 0.86 | 2.39 | 5 | 9.9 |
| 14 | A1 | C11 | 0 | 0.34 | 2.38 | 21 | 2.9 |
| 15 | A1 | C12 | 6 | 0.74 | 2.92 | 11 | 9.9 |
| 16 | A1 | C13 | 10 | 0.86 | 2.99 | 5 | 9.9 |
| 17 | A1 | C14 | 0 | 0.34 | — | 5 | 9.9 |
| 18 | A6 | C1 | 4 | 0.34 | 2.01 | 21 | 2.9 |
| 19 | A7 | C1 | 10 | 0.34 | 1.33 | 21 | 2.9 |
| 20 | A8 | C1 | 0 | — | 2.92 | 5 | 9.9 |

In the table, the difference in carbon number between a0 and b0 indicates the absolute value of the difference between the carbon number of the linear aliphatic polyhydric alcohol a0 and the carbon number of the linear aliphatic polyhydric alcohol b0. The softening point indicates the difference between the softening points $T_A$ and $T_M$. The difference in SP value between a1 and c2 indicates the difference (a1−c2) between the SP value of the amorphous polyester segment a1 and the SP value of the crystalline polyester segment c2. The difference in SP value between a2 and c1 indicates the difference (a2−c1) between the SP value of the amorphous polyester segment a2 and the SP value of the crystalline segment c1. The unit of the SP value is $(cal/cm^3)^{0.5}$.

Production Example of Magnetic Carrier 1

Magnetite 1 with a number average particle diameter of 0.30 μm (magnetization strength of 65 $Am^2/kg$ under a magnetic field of 1000/4π (kA/m))

Magnetite 2 with a number average particle diameter of 0.50 μm (magnetization strength of 65 $Am^2/kg$ under a magnetic field of 1000/4π (kA/m))

Fine particles of each type were treated by adding 4.0 parts of a silane compound (3-(2-aminoethylaminopropyl) trimethoxysilane) to 100 parts of each of the above materials and high-speed mixing and stirring in a container at 100° C. or higher.

Phenol: 10% by mass

Formaldehyde solution: 6% by mass (formaldehyde 40% by mass, methanol 10% by mass, water 50% by mass)

Magnetite 1 treated with the above silane compound: 58% by mass

Magnetite 2 treated with the above silane compound: 26% by mass

A total of 100 parts of the above materials, 5 parts of a 28% by mass aqueous ammonia solution, and 20 parts of water were placed in a flask, heated to 85° C. in 30 min while stirring and mixing, and held for 3 h for polymerization reaction to cure the produced phenolic resin.

After that, the cured phenolic resin was cooled to 30° C., water was added, the supernatant was removed, and the precipitate was washed with water and air-dried. Next, this was dried at a temperature of 60° C. under reduced pressure (5 mmHg or less) to obtain a magnetic body-dispersed spherical magnetic carrier 1. The volume-based 50% particle size (D50) was 34.21 μm.

Production Example of Two-Component Developer 1

A total of 92.0 parts of the magnetic carrier 1 and 8.0 parts of the toner 1 were mixed with a V-type mixer (V-20, manufactured by Seishin Corporation) to obtain a two-component developer 1.

Production Examples of Two-Component Developer 2 to Two-Component Developer 20

Two-component developer 2 to two-component developer 20 were obtained by performing the same operations as in the production example of two-component developer 1, except for making changes as shown in Table 9.

TABLE 9

| | Two-component developer | Magnetic carrier | Toner |
|---|---|---|---|
| Example 1 | 1 | 1 | 1 |
| Example 2 | 2 | 1 | 2 |
| Example 3 | 3 | 1 | 3 |
| Example 4 | 4 | 1 | 4 |
| Example 5 | 5 | 1 | 5 |
| Example 6 | 6 | 1 | 6 |
| Example 7 | 7 | 1 | 7 |
| Example 8 | 8 | 1 | 8 |
| Example 9 | 9 | 1 | 9 |
| Example 10 | 10 | 1 | 10 |
| Example 11 | 11 | 1 | 11 |
| Comparative Example 1 | 12 | 1 | 12 |

TABLE 9-continued

| | Two-component developer | Magnetic carrier | Toner |
|---|---|---|---|
| Comparative Example 2 | 13 | 1 | 13 |
| Comparative Example 3 | 14 | 1 | 14 |
| Comparative Example 4 | 15 | 1 | 15 |
| Comparative Example 5 | 16 | 1 | 16 |
| Comparative Example 6 | 17 | 1 | 17 |
| Comparative Example 7 | 18 | 1 | 18 |
| Comparative Example 8 | 19 | 1 | 19 |
| Comparative Example 9 | 20 | 1 | 20 |

Evaluation

Evaluation was performed using the two-component developer 1.

As an image forming apparatus, a modified Canon digital printer imageRUNNER ADVANCE C5560 for commercial printing was used, and the two-component developer 1 was put in the Bk developing device. The apparatus was modified by making changes such that the fixing temperature, process speed, DC voltage $V_{DC}$ of the developer carrier, charging voltage $V_D$ of the electrostatic latent image bearing member, and laser power could be set freely. As for image output evaluation, an FFh image (solid image) with a desired image ratio was output, $V_{DC}$, $V_D$, and laser power were adjusted to obtain the desired toner laid-on level on the FFh image on paper, and the following evaluation was performed.

FFh is a value representing 256 gradations in hexadecimal; 00h is the first gradation (white background) of 256 gradations, and FFh is the 256th gradation (solid portion) of 256 gradations.

The evaluation was performed based on the following evaluation methods, and the results are shown in Table 10.

Low-Temperature Fixability

Paper: GFC-081 (81.0 g/m$^2$) (sold by Canon Marketing Japan Inc.)

Toner laid-on level on paper: 0.50 mg/cm$^2$ (adjusted by the DC voltage $V_{DC}$ of the developer carrier, the charging voltage $V_D$ of the electrostatic latent image bearing member, and the laser power)

Evaluation image: a 2 cm×5 cm image was placed in the center of the A4 paper

Test environment: low-temperature and low-humidity environment: temperature 15° C./humidity 10% RH (hereinafter "L/L")

Fixing temperature: 150° C.

Process speed: 377 mm/sec

The evaluation image was output and the low-temperature fixability was evaluated. The value of the image density reduction rate was used as an evaluation index for low-temperature fixability. The image density reduction rate was determined by first measuring the image density at the center using an X-Rite color reflection densitometer (500 series: manufactured by X-Rite, Inc.). Next, a load of 4.9 kPa (50 g/cm$^2$) was applied to the portion where the image density was measured, the fixed image was rubbed (five reciprocations) with Silbon paper, and the image density was measured again.

Then, the rate of decrease in image density before and after rubbing was calculated using the following formula. The obtained reduction rate of image density was evaluated according to the following evaluation criteria. Where the evaluation was A to C, it was determined to be good.

Reduction rate of image density=[(image density before rubbing)−(image density after rubbing)]/(image density before rubbing)×100

Evaluation Criteria

A: Reduction rate of image density is less than 3%

B: Reduction rate of image density is 3% or more and less than 5%

C: Reduction rate of image density is 5% or more and less than 8%

D: Reduction rate of image density is 8% or more

Image Heat Resistance (Heat Resistance and Pressure Resistance)

Paper: CS-680 (68.0 g/m$^2$)

(sold by Canon Marketing Japan Inc.)

Toner laid-on level on paper: 1.20 mg/cm$^2$

Evaluation image: a 10 cm×10 cm image (100 cm$^2$ image) was placed in the center of the A4 paper Fixing test environment: low-temperature and low-humidity environment: temperature 15° C./humidity 10% RH (hereinafter "L/L")

Process speed: 450 mm/sec

Fixing temperature: low-temperature fixability evaluation temperature+10° C.

Using the above image forming apparatus, one fixed image was output under the above conditions, a paper bundle (CS-680, 500 sheets) was stacked thereon, and the output object and paper bundle were placed in a thermostat set at 65° C. and 40% RH and allowed to stand therein for 10 h.

Next, the output object and one sheet of paper thereon were removed from the thermostat and allowed to cool for 1 h, and then the two sheets were peeled off. At that time, the density of the image adhered to the paper was evaluated using the X-Rite color reflection densitometer (500 series: manufactured by X-Rite, Inc.). Where the evaluation was A to C, it was determined to be good.

Evaluation Criteria for Density of Image Adhered to Paper

A: less than 0.10

B: 0.10 or more and less than 0.30

C: 0.30 or more and less than 0.50

D: 0.50 or more

Blooming Resistance

Instead of confirming the actual change over time in an assumed environment for a period of 2 to 3 years, the blooming resistance was evaluated by the image density during image formation after performing a heat cycle test in which a cycle of applying higher temperature and humidity than those actually assumed and returning to normal temperature was repeated, allowing the toner to stand in a severe environment. With the toner with excellent blooming resistance, outmigration of the crystalline polyester C to the toner surface was suppressed even after the toner was allowed to stand in a severe environment, and image density reduction or the like caused by contamination of the developer carrying member with the out-migrated crystalline polyester C did not occur.

The Canon's full-color copier imagePress C800 was used as the image forming apparatus, the two-component developer to be evaluated was put into the black developing device of the image forming apparatus, the toner to be evaluated was put into the black toner container, and the following evaluation was performed.

The modification involved the removal of a mechanism for discharging excess magnetic carrier that is located inside the developing device from the developing device. Plain paper GF-0081 (A4, basis weight 81.4 g/m$^2$, sold by Canon Marketing Japan Inc.) was used as evaluation paper.

The toner laid-on level on the paper in the FFh image (solid image) was adjusted to 0.45 mg/cm$^2$. FFh is a value representing 256 gradations in hexadecimal; 00h is the first gradation (white background) of 256 gradations, and FFh is the 256th gradation (solid portion) of 256 gradations.

The X-Rite color reflection densitometer (500 series: manufactured by X-Rite, Inc.) was used, 50,000 sheets of FFh images with a size of 5 cm×5 cm were output, and the image density of the first and 50,000th images was measured. The amount of change in image density between the toner before and after standing under severe storage conditions described hereinbelow was evaluated according to the following criteria.

Evaluation Criteria: Amount of Change in Image Density

A: less than 0.05

B: 0.05 or more and less than 0.10

C: 0.10 or more and less than 0.20

D: 0.20 or more

Severe Storage Conditions

The toner to be evaluated was placed in a thermohydrostat set at 25° C./60% RH. Next, the atmosphere in the thermohydrostat was linearly changed to 50° C./90% RH over 12 h. Next, 20 cycles of lowering and raising temperature were continuously repeated, one cycle including lowering the temperature to 25° C./90% RH over 12 h, and then raising the temperature to 50° C./90% RH over 12 h.

After the temperature rise of the 20th cycle was completed, the temperature of the atmosphere in the thermohydrostat was lowered to 40° C./90% RH over 6 h, the toner was allowed to stand at 40° C./90% RH for 10 days, and after the temperature was finally lowered to 25° C./60% RH over 6 h, the toner was taken out from the thermohydrostat.

Examples 2 to 11 and Comparative Examples 1 to 9

Evaluations were performed in the same manner as in Example 1, except that two-component developers 2 to 20 were used. Table 10 shows the evaluation results.

The present disclosure can provide a toner exhibiting excellent image heat resistance and blooming resistance, as well as low-temperature fixability enabling fixing at a lower temperature.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-046563, filed Mar. 23, 2022, which is hereby incorporated by reference herein in its entirety.

What is claimed is:

1. A toner comprising a toner particle comprising a binder resin, wherein the binder resin comprises an amorphous polyester A and a crystalline polyester C;

the amorphous polyester A has an amorphous polyester segment a1 and an amorphous polyester segment a2;

the amorphous polyester segment a2 has a monomer unit of a linear aliphatic polyhydric alcohol a0 having a carbon number of 2 to 10 as a monomer unit forming a main skeleton of the amorphous polyester segment a2;

a difference between an SP value of the amorphous polyester segment a2 and an SP value of the amorphous polyester segment a1 [(SP value of a2)−(SP value of a1)] is 0.80 $(cal/cm^3)^{0.5}$ or more;

the crystalline polyester C is a polymer having a crystalline polyester segment c2 and a crystalline segment c1 bonded to the end of the crystalline polyester segment c2;

TABLE 10

| | Low-temperature fixability [%] | | | | Image heat resistance [—] | | Blooming resistance [—] | |
|---|---|---|---|---|---|---|---|---|
| | | Image density before rubbing | Image density after rubbing | Reduction rate | | Image density | | Amount of change in image density |
| Example 1 | A | 1.35 | 1.32 | 2% | A | 0.02 | A | 0.03 |
| Example 2 | B | 1.35 | 1.31 | 3% | A | 0.02 | B | 0.08 |
| Example 3 | A | 1.35 | 1.32 | 2% | B | 0.12 | A | 0.03 |
| Example 4 | A | 1.35 | 1.32 | 2% | C | 0.35 | A | 0.03 |
| Example 5 | A | 1.35 | 1.32 | 2% | B | 0.12 | A | 0.03 |
| Example 6 | A | 1.35 | 1.32 | 2% | C | 0.35 | A | 0.03 |
| Example 7 | B | 1.35 | 1.31 | 3% | A | 0.02 | A | 0.03 |
| Example 8 | C | 1.35 | 1.28 | 5% | A | 0.02 | A | 0.03 |
| Example 9 | A | 1.35 | 1.32 | 2% | R | 0.12 | B | 0.08 |
| Example 10 | A | 1.35 | 1.32 | 2% | C | 0.35 | C | 0.13 |
| Example 11 | B | 1.35 | 1.31 | 3% | A | 0.02 | A | 0.03 |
| Comparative Example 1 | A | 1.35 | 1.32 | 2% | D | 0.60 | A | 0.03 |
| Comparative Example 2 | D | 1.35 | 1.24 | 8% | A | 0.02 | A | 0.03 |
| Comparative Example 3 | A | 1.35 | 1.32 | 2% | D | 0.60 | A | 0.03 |
| Comparative Example 4 | A | 1.35 | 1.32 | 2% | A | 0.02 | D | 0.20 |
| Comparative Example 5 | B | 1.35 | 1.31 | 3% | D | 0.60 | D | 0.20 |
| Comparative Example 6 | A | 1.35 | 1.32 | 2% | D | 0.60 | A | 0.03 |
| Comparative Example 7 | A | 1.35 | 1.32 | 2% | D | 0.60 | C | 0.13 |
| Comparative Example 8 | A | 1.35 | 1.32 | 2% | D | 0.60 | D | 0.20 |
| Comparative Example 9 | D | 1.35 | 1.24 | 8% | A | 0.02 | A | 0.03 |

the crystalline polyester segment c2 has a monomer unit of a linear aliphatic polyhydric alcohol b0 having a carbon number of 2 to 10 as a monomer unit forming a main skeleton of the crystalline polyester segment c2;

an absolute value of a difference between a carbon number of the linear aliphatic polyhydric alcohol a0 and a carbon number of the linear aliphatic polyhydric alcohol b0 is 4 or less;

a difference between an SP value of the crystalline polyester segment c2 and an SP value of the crystalline segment c1 [(SP value of c2)−(SP value of c1)] is 0.75 $(cal/cm^3)^{0.5}$ or more;

a difference between the SP value of the amorphous polyester segment a1 and the SP value of the crystalline polyester segment c2 [(SP value of a1)−(SP value of c2)] is 0.80 $(cal/cm^3)^{0.5}$ or less; and a difference between the SP value of the amorphous polyester segment a2 and the SP value of the crystalline segment c1 [(SP value of a2)−(SP value of c1)] is 2.00 $(cal/cm^3)^{0.5}$ or more.

2. The toner according to claim 1, wherein the crystalline polyester segment c2 has the monomer unit of the linear aliphatic polyhydric alcohol b0 and a monomer unit of an aliphatic dicarboxylic acid; and where the carbon number of the linear aliphatic polyhydric alcohol b0 is denoted by N1 and the carbon number of the aliphatic dicarboxylic acid is denoted by N2, the N1 and the N2 satisfy a following formula (1):

$$N2/N1 \geq 2.0 \quad (1).$$

3. The toner according to claim 1, wherein the crystalline segment c1 is at least one of a monomer unit of an aliphatic monocarboxylic acid and a monomer unit of an aliphatic monoalcohol; and the crystalline segment c1 has a hydrocarbon group having a carbon number of 9 to 30 and bonded via an ester bond to the end of the crystalline polyester segment c2.

4. The toner according to claim 1, wherein the content ratio of a structure in which the crystalline segment c1 is bonded to the main chain end of the crystalline polyester segment c2 in the crystalline polyester C is 60.0 mol % or more.

5. The toner according to claim 1, wherein the absolute value of the difference between the carbon number of the linear aliphatic polyhydric alcohol a0 and the carbon number of the linear aliphatic polyhydric alcohol b0 is zero.

6. The toner according to claim 1, wherein the amorphous polyester segment a1 has a monomer unit of a polyhydric aromatic phenol.

7. The toner according to claim 1, wherein where a softening point of the amorphous polyester A measured by a flow tester is denoted by $T_A$ (° C.), and a softening point of a melted mixture obtained by mixing the amorphous polyester A and the crystalline polyester C at a mass ratio of the amorphous polyester A and the crystalline polyester C in the toner is denoted by $T_M$ (° C.), the difference $(T_A - T_M)$ between the $T_A$ and the $T_M$ is 7 to 20° C.

8. The toner according to claim 1, wherein where a storage elastic modulus at 60° C. when the temperature is increased in measurement of a storage elastic modulus G' of the toner is defined as a temperature-increase G' and a storage elastic modulus at 60° C. when the temperature is decreased is defined as a temperature-decrease G', (temperature-increase G')/(temperature-decrease G') is 3.0 or more.

9. The toner according to claim 1, wherein the content ratio of the crystalline polyester C in the binder resin is 3 to 20% by mass.

* * * * *